US008289355B2

(12) United States Patent
Shoji

(10) Patent No.: US 8,289,355 B2
(45) Date of Patent: Oct. 16, 2012

(54) IMAGE GENERATING APPARATUS AND CALIBRATION METHOD THEREFOR

(75) Inventor: Atsushi Shoji, Tokyo (JP)

(73) Assignee: Canon Kabushiki Kaisha (JP)

( * ) Notice: Subject to any disclaimer, the term of this patent is extended or adjusted under 35 U.S.C. 154(b) by 676 days.

(21) Appl. No.: 12/273,665

(22) Filed: Nov. 19, 2008

(65) Prior Publication Data

US 2009/0129804 A1 May 21, 2009

(30) Foreign Application Priority Data

Nov. 20, 2007 (JP) ................................. 2007-300967

(51) Int. Cl.
*B41J 2/435* (2006.01)
*G01D 15/08* (2006.01)
*G01D 15/06* (2006.01)

(52) U.S. Cl. ......................... 347/224; 347/162; 347/116

(58) Field of Classification Search .................. 347/224, 347/116, 162
See application file for complete search history.

(56) References Cited

U.S. PATENT DOCUMENTS

| | | | | |
|---|---|---|---|---|
| 6,278,857 | B1 * | 8/2001 | Monji et al. | 399/301 |
| 6,906,832 | B2 * | 6/2005 | Furukawa et al. | 358/480 |
| 2004/0161268 | A1 * | 8/2004 | Tomita et al. | 399/301 |
| 2006/0045577 | A1 * | 3/2006 | Maeda | 399/301 |

FOREIGN PATENT DOCUMENTS

| | | | |
|---|---|---|---|
| JP | 2004-170755 | A | 6/2004 |
| JP | 2005-297392 | A | 10/2005 |
| JP | 2006-044097 | A | 2/2006 |
| JP | 2007-163679 | A | 6/2007 |
| JP | 2007-203590 | A | 8/2007 |

OTHER PUBLICATIONS

JP Office Action issued Apr. 2, 2012 for corresponding JP 2007-300967.

* cited by examiner

*Primary Examiner* — Stephen Meier
*Assistant Examiner* — Sarah Al Hashimi
(74) *Attorney, Agent, or Firm* — Rossi, Kimms & McDowell LLP

(57) ABSTRACT

To correct distortion in an optical system of an optical scanning, electrophotographic image generating apparatus, a parallel line group 107' is printed by a printing apparatus to be calibrated on a sheet on which a correction pattern 101 has been printed. The user reads marker positions to find amounts of deviation of the adjustment pattern from the correction pattern and inputs the amounts of deviation in the printing apparatus. The printing apparatus interpolates values between the input amounts of deviation, establishes positions at which a line in the adjustment pattern deviate one pixel in a sub-scanning direction as scan line changing points and generate new conversion information by pairing the scan line changing points with respective directions of deviation. During image generation, the printing apparatus prints an image by correcting image data according to the conversion information.

13 Claims, 21 Drawing Sheets

IMAGE GENERATING APPARATUS AND CALIBRATION METHOD THEREFOR

BACKGROUND OF THE INVENTION

1. Field of the Invention

The present invention relates to an electrophotographic image generating apparatus which generates an image by scanning a photosensitive member with an optical beam and to a calibration method therefor.

2. Description of the Related Art

An optical scanning, electrophotographic image generating apparatus forms a latent image on a photosensitive member by optical drawing, develops the latent image with toner, transfers a resulting toner image to paper, fixes the toner image, and thereby produces a printout.

Basically, the optical scanning image generating apparatus has a single light source. However, to produce a printout at high speed using a low-speed device, a number of light sources are used in parallel in a single optical system. This reduces operating frequencies of an electronic circuit's drive unit and a processing system. In the case of color image generation, the image generating apparatus has as many light sources as there are color components if it is configured to have separate optical systems for different color components.

The electrophotographic image generating apparatus performs two-dimensional image generation using two-dimensional scanning resulting from a combination of main scanning, orthogonal to a sub-scanning direction of the photosensitive member, and sub-scanning carried out by rotation and the like of the photosensitive member. Consequently, drawing accuracy is greatly affected by optical system's accuracy, which depends on mounting of an optical mechanism as well as by travel accuracy of a scan driver. To maintain the drawing accuracy at low cost, a method has been proposed which permits, to some extent, unevenness (so-called misregistration) such as a skewed and/or inclined track of main scanning resulting from low mechanical accuracy and corrects the unevenness on images. For example, Japanese Patent Laid-Open No. 2004-170755 discloses a method which measures magnitudes of inclination and skew of scanning lines by means of an optical sensor, corrects bitmap image data so as to cancel the inclination and skew, and generates a corrected image. The method disclosed in Japanese Patent Laid-Open No. 2004-170755 corrects misregistration using a scan line changing process and tone correction process. The scan line changing process is the process of canceling deviation of an actual scan line from an ideal scan line by shifting image data by the same amount in the opposite direction, where the ideal scan line is assumed to be a straight line on a surface of a photosensitive drum parallel to a rotation axis of the photosensitive drum. The tone correction process is the process of apparently correcting a deviation smaller than one line by providing a density gradient in a certain range in front of and behind a point at which the line deviates (scan line changing point). Since the method corrects image data, it eliminates the need for a mechanical adjustment member or adjustment process during assembly. Thus, the method makes it possible to downsize color image generating apparatus and deal with misregistration at low cost.

To convert image information by image processing using an electronic circuit or software instead of adjusting the optical system, amounts of correction for skew and distortion of main scanning are measured and digitalized at the factory. The digitalized amounts of correction are stored in a storage of each image generating apparatus and then referred to during image generation to correct the image for skew and distortion of main scanning.

However, the amounts of correction measured at the factory for the image generating apparatus can change if optical parts are worn or torn over time or replaced due to a failure. In that case, amounts of correction have to be measured anew. This is done in an end-use environment or by returning the image generating apparatus to the factory, resulting in high costs and thus rendering cost reduction of the image generating apparatus meaningless.

SUMMARY OF THE INVENTION

The present invention has been made in view of the conventional example described above and provides an optical scanning, electrophotographic image generating apparatus which can correct degradation of image quality due to skew and distortion of main scanning using simple procedures as well as provides a calibration method for the image generating apparatus.

For that, the present invention has the following configuration.

According to the present invention, an image generating apparatus comprises:

an image generator configured to generate an image on a photosensitive member by scanning the photosensitive member in a main scanning direction and a sub-scanning direction with an optical beam;

an output controller configured to generate an adjustment pattern containing a straight line object running along the main scanning direction using the image generator and output the adjustment pattern to a printing medium;

an input unit configured to accept input of an adjustment parameter which represents an amount of deviation of the straight line object from a straight line running in the main scanning direction and recorded on the printing medium;

a conversion information generator configured to generate conversion information based on the adjustment parameter inputted by the input unit, the conversion information being used to correct deviation, in the sub-scanning direction, of the image generated by the image generator; and a conversion information storage configured to store the conversion information.

The present invention makes it possible to acquire a parameter for correction of main scanning lines using simple procedures, and thereby reduce adjustment costs of the image generating apparatus.

Further features of the present invention will become apparent from the following description of exemplary embodiments with reference to the attached drawings.

DESCRIPTION OF THE EMBODIMENTS

First Embodiment

Figure 3:
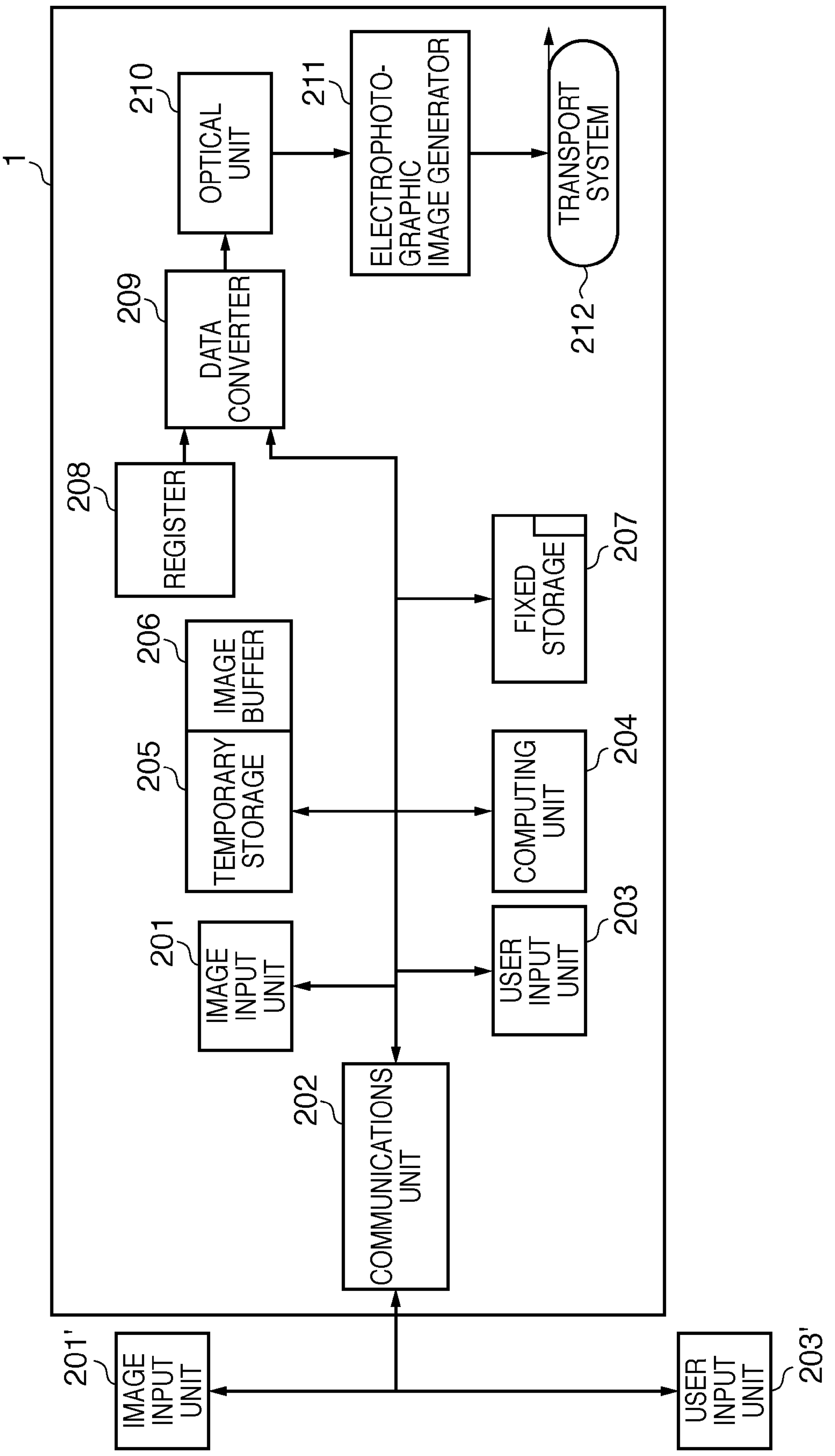
FIG. 3 is a diagram showing an exemplary configuration of a multicolor printing apparatus according to an embodiment of the present invention.

FIG. 3 is a block diagram showing a digital multi function peripheral 1 according to an embodiment of the present invention, where the digital multi function peripheral 1 is a color image generating apparatus and will be referred to hereinafter as a multicolor printing apparatus. In FIG. 3, image input units 201 and 201' are, for example, image scanners. When the multicolor printing apparatus is a printer there is no such component as an image input unit 201. The image input units 201 and 201' are sometimes connected as external apparatus via an interface. A communications unit 202 is, for example, a LAN interface and serves as a means of communications with external apparatus. The communications unit 202 receives print information from an external apparatus, receives image data from external image input units, and transmits and receives data to change operation mode based on commands from a user input unit on an external apparatus. A user input unit 203 is, for example, an operation panel mounted on the printing apparatus. A user input unit 203' is, for example, a user interface mounted as a program on an external apparatus such as a computer. The multicolor printing apparatus 1 has at least one of the user input units 203 and 203'.

A computing unit 204 is a CPU, hardware dedicated to image processing or the like, or a combination thereof. Processes which require high processing speed and whose procedures are fixed are implemented by hardware. Processes which do not require high processing speed and processes which need to be varied widely are implemented by software running on a CPU.

A temporary storage 205 is, for example, a RAM. The temporary storage 205 stores image information or partial information thereof, intermediate information, parameter information to be stored temporarily, and the like. Part of the temporary storage 205 constitutes an image buffer 206 in which output images are generated. A fixed storage 207 is non-volatile storage means which can store data when power is turned off. The fixed storage 207 stores programs executed by the computing unit 204, various configuration parameters, and the like. Furthermore, the fixed storage 207 stores conversion information used to correct optical distortion of printing mechanisms (including amounts of correction of misregistration) and parameters (image information) characteristic of the present invention.

A register 208 stores conversion information. The register 208 is constituted of a rewritable non-volatile memory or the like. A data converter 209 subjects image data in the image buffer 206 to a conversion process for correction of optical distortion based on the conversion information in the register 208 and outputs the image data to a downstream optical system.

An optical system 210 includes optical components such as a semiconductor laser, reflecting mirror, and lens as well as a photosensitive member. The optical system 210 scans the photosensitive member with a light beam based on the image information. In the case of multicolor printing which uses a so-called tandem system, an optical system is provided for each color component. An electrophotographic image generator 211 develops an electrostatic latent image formed optically on a surface of the photosensitive member with toner and thereby generates a toner image which reproduces visual shading. A transport system 212 transfers the toner image to printing paper from the photosensitive member or from a transcriptional body to which the toner image has been transferred from the photosensitive member. The transport system 212 ejects the printing paper after fixing.

In addition to a configuration of a regular multicolor printing apparatus, the multicolor printing apparatus according to the present embodiment is configured to print a prestored adjustment pattern on a correction pattern printed separately. An adjustment parameter is read by a user or reader from the printed adjustment pattern and correction pattern. The adjustment parameter is input in the multicolor printing apparatus by the reader or manually by the user and old conversion information is overwritten by new conversion information generated from the inputted adjustment parameter.

The adjustment pattern is stored as information in part of the fixed storage 207. Procedures for updating the conversion information is implemented by programs stored in the computing unit 204 and fixed storage 207. Printing of the adjustment pattern is included in an application for printing a test pattern such as provided on conventional apparatus. Scan command mode is software-based, and calculation of conversion information is also a genuine software process. Thus, the apparatus can be configured by adding software components to conventional physical components, and there is no need to add any hardware component.

<Correction Pattern and Adjustment Pattern>

Figure 1:
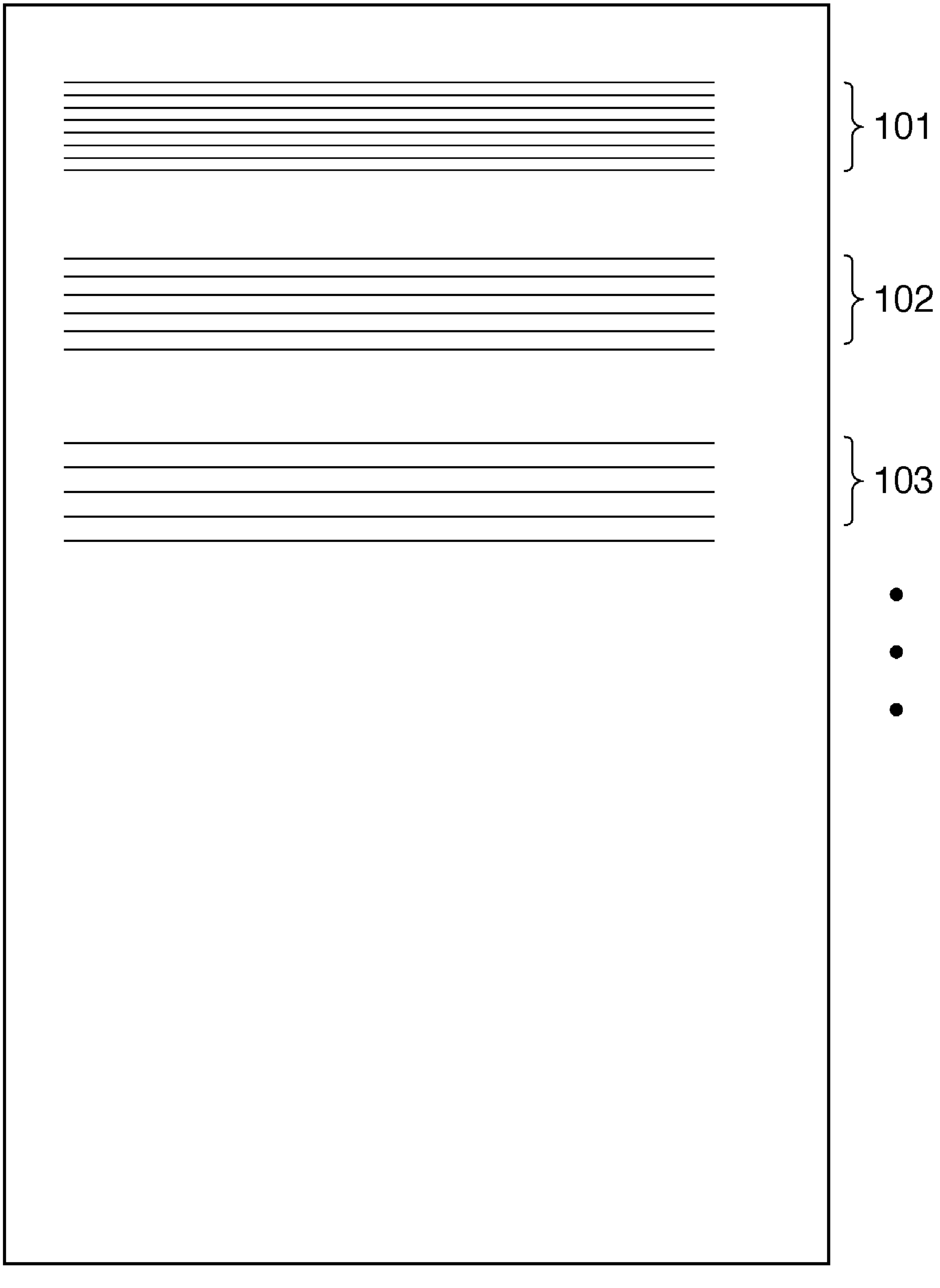
FIG. 1 is a diagram showing an exemplary correction pattern.

FIG. 1 shows an exemplary correction pattern. The correction pattern consists of a parallel lines or groups of parallel lines orthogonal to a transport direction (i.e., a sub-scanning direction). According to the present embodiment, the correction pattern has been printed in advance on a printing medium. The parallel line groups provide reference position information and scale divisions to an adjustment pattern printed over the correction pattern. There are as many as $10^3$ to $10^4$ pixels per line along a main scanning direction, and it is totally unrealistic to visually read amounts of deviation in the sub-scanning direction of all the pixels in one line. Thus, in order to read some discrete values as representative values, markers are placed discretely on the correction pattern or adjustment pattern so as to read the amounts of deviation of marker positions from the sub-scanning direction. According to the present embodiment, the correction pattern has been printed in advance on paper.

Due to smallness of pixel size and instability of drawing in electrophotography, it is difficult to read the amounts of deviation accurately from the adjustment pattern when printed. Therefore, the parallel line groups in the correction pattern are provided as line patterns a few pixels apart and used as reference values when the amounts of deviation are read. When the user reads the amounts of deviation of mark positions as an adjustment parameter, if the amounts of deviation are smaller than line intervals (referred to as a period) of the parallel lines, the observer's subjectivity tends to get involved. Thus, instead of keeping the period of the correction pattern constant, different parallel line patterns whose periods are coprime to each other are provided. The periods correspond to the scale divisions used to read the amounts of deviation. More accurate values are estimated based on a combination of readouts from scale divisions of different periods. As an example, FIG. 1 shows three parallel line groups 101, 102, and 103. Although it is not clear from FIG. 1, desirably, the periods of the three parallel line groups are coprime to each other.

Although three parallel line groups are shown in FIG. 1, the number of parallel line groups, which depends on the balance between necessary accuracy and trouble of visual reading, may be less than or more than three. The number of parallel line groups to be used and intervals between the parallel lines in each parallel line group are adjusted depending on printing accuracy and required accuracy of the machine to be calibrated.

Figure 2:
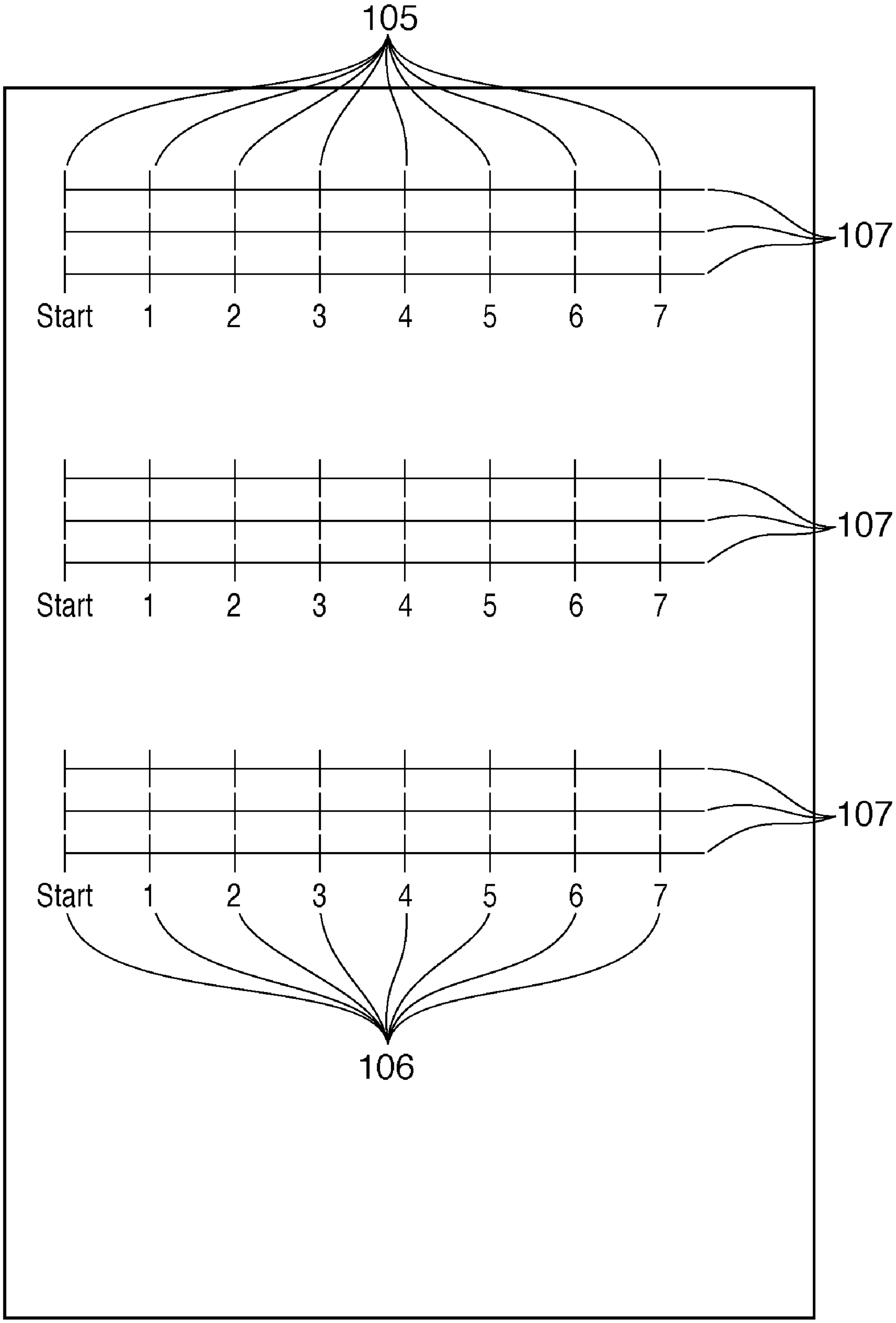
FIG. 2 is a diagram showing an exemplary adjustment pattern.

FIG. 2 shows an exemplary adjustment pattern. The adjustment pattern is mainly made up of straight-line image objects (hereinafter referred to as a straight line objects or straight lines) running in the main scanning direction. Also, the adjustment pattern includes at least one line drawn at a position which corresponds to each parallel line group of the correction pattern. To distinguish multiple adjustment patterns in FIG. 2 from each other, an adjustment-pattern number may be printed at the upper left of each adjustment pattern. "Adjustment pattern (1)," "adjustment pattern (2)," and "adjustment pattern (3)" (not shown) are printed in the example of FIG. 2. If there is no misregistration of main scanning lines produced by an optical beam, the adjustment patterns, when printed over the correction pattern, are drawn as groups of parallel straight lines. On the other hand, if there is misregistration, the adjustment patterns are not drawn as lines parallel to the correction pattern, but drawn as inclined or curved lines with respect to the correction pattern.

In FIG. 2, the parallel line groups 107 of the adjustment patterns serve as reference lines used to find differences from the correction pattern. Each parallel line group is provided with markers 105 and marker intervals are determined in advance. The user visually reads the amounts of deviation at marker positions and inputs readouts via a user input unit. Alternatively, the amounts of deviation at marker positions may be determined through image recognition by reading the markers with a scanner. Name labels 106 are assigned to the markers 105, as required, to make it easy to recognize the markers 105. It is sufficient for the adjustment pattern to have one line of the parallel line groups 107 in the correction pattern, but it will be more convenient if the adjustment pattern has such a phase relationship with the correction pattern as to make visual reading easier. Thus, multiple sets of parallel lines are drawn at intervals different from the intervals of the correction pattern on which the adjustment patterns are superimposed. The adjustment patterns are drawn at positions different from the parallel line groups of the correction pattern. Incidentally, straight lines or parallel lines mentioned in relation to adjustment patterns mean that lines become straight or parallel when printed on a calibrated printing apparatus. Consequently, adjustment patterns which have various phase relationships with the periods of the parallel line groups in the correction pattern are superimposed on the correction pattern. The user selects one adjustment pattern which has such a phase relationship with the correction pattern as to make visual reading easier and uses the adjustment pattern for readout procedures. Incidentally, although markers in different parallel line groups are drawn at the same positions in FIG. 2, markers in different parallel line groups may be drawn at different positions. Also, although markers are drawn as part of the adjustment pattern in FIG. 2, the markers may be drawn in the correction pattern.

<Reading and Inputting an Adjustment Parameter>

Figure 4A:
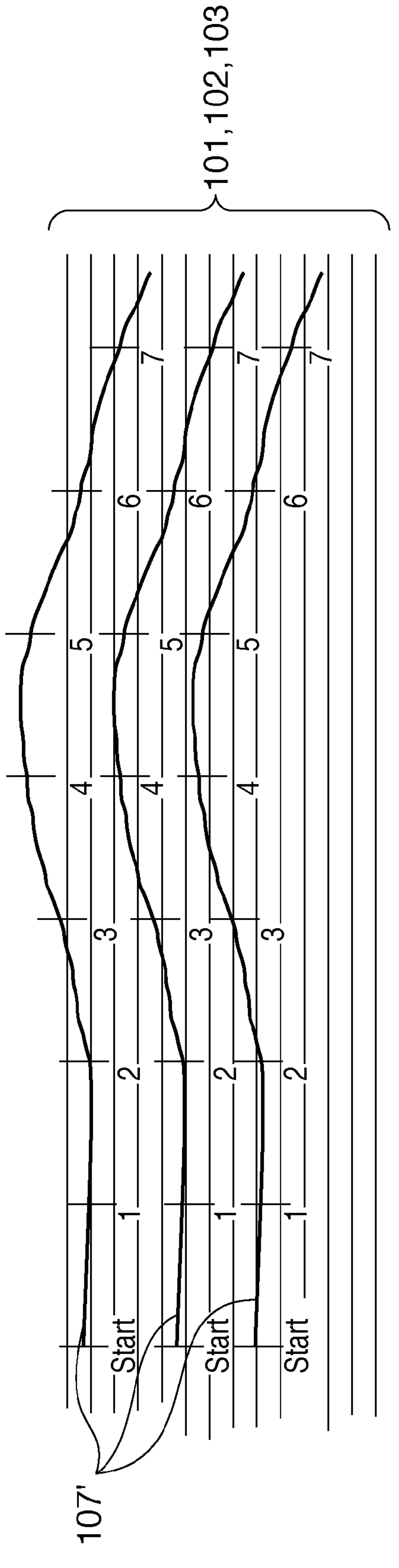
FIGS. 4A and 4B are diagrams showing exemplary output images.

FIG. 4A shows an exemplary output image in which a correction pattern and adjustment patterns are superimposed. Although the parallel line groups 107 in FIG. 2 is drawn as horizontal straight lines, the lines in adjustment patterns are usually distorted when printed on a multicolor printing apparatus which contains distortion (misregistration) in the optical system. In such a case, adjustment patterns are printed on a correction pattern 100, being deviated (distorted) in the sub-scanning direction, as exemplified by a parallel line group 107' shown in FIG. 4A. The user selects and reads the adjustment pattern which has such a phase relationship with the correction pattern that the user can get numeric readouts most easily.

Figure 4B:
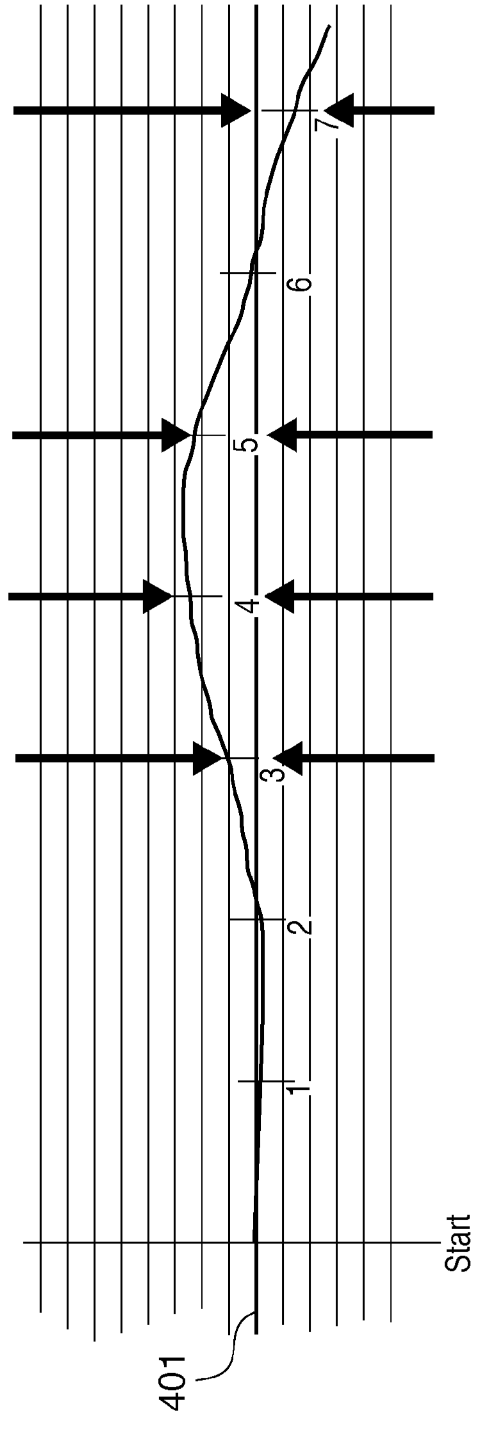

FIG. 4B shows an example in which readouts are taken from a selected adjustment pattern. The user reads values using a correction pattern's line 401 which coincides with an adjustment pattern's line at a marker position labeled "Start" as a reference line. Although marker 1 and subsequent markers are placed only on the reference line, it is desirable, of course, to place markers in such a way that marker positions can be read accurately on all the lines. In the following description, the name labels of the markers will be referred to as marker numbers.

At the marker position labeled "Start," since the reference line 401 fits perfectly with the adjustment pattern, the value of the adjustment parameter is 0. Similarly, the values of the adjustment parameter at the positions of markers 1 and 2 are also 0. At the position of marker 3, the adjustment parameter is deviated in the sub-scanning direction by one line or more, and thus the deviation can be read as a numeric value. The readout is given as the number of lines of deviation, and the value of the adjustment parameter at the position of marker 3 in FIG. 4B is 1. Similarly, the readout at the position of marker 4 is 3 and the readout at the position of marker 5 is 2. At the position of marker 6, the adjustment pattern's line returns to the reference line, giving a readout of 0. At the position of marker 7, the adjustment pattern's line swings in the opposite direction, giving a readout of −2.

Values relative to the reference line will suffice as the adjustment pattern's amounts of deviation from the correction pattern. Therefore, any line in the correction pattern may be used as a reference line. However, if a line which coincides with an adjustment pattern's line at the right-end or left-end marker position is used as a reference line, readouts can be reduced to close to 0. Of course, the use of any line in the correction pattern as a reference will simply adds a constant as an offset to all the readouts, and the offset is cancelled during calculation of the conversion information.

<Calibration Procedures>

Figure 21:
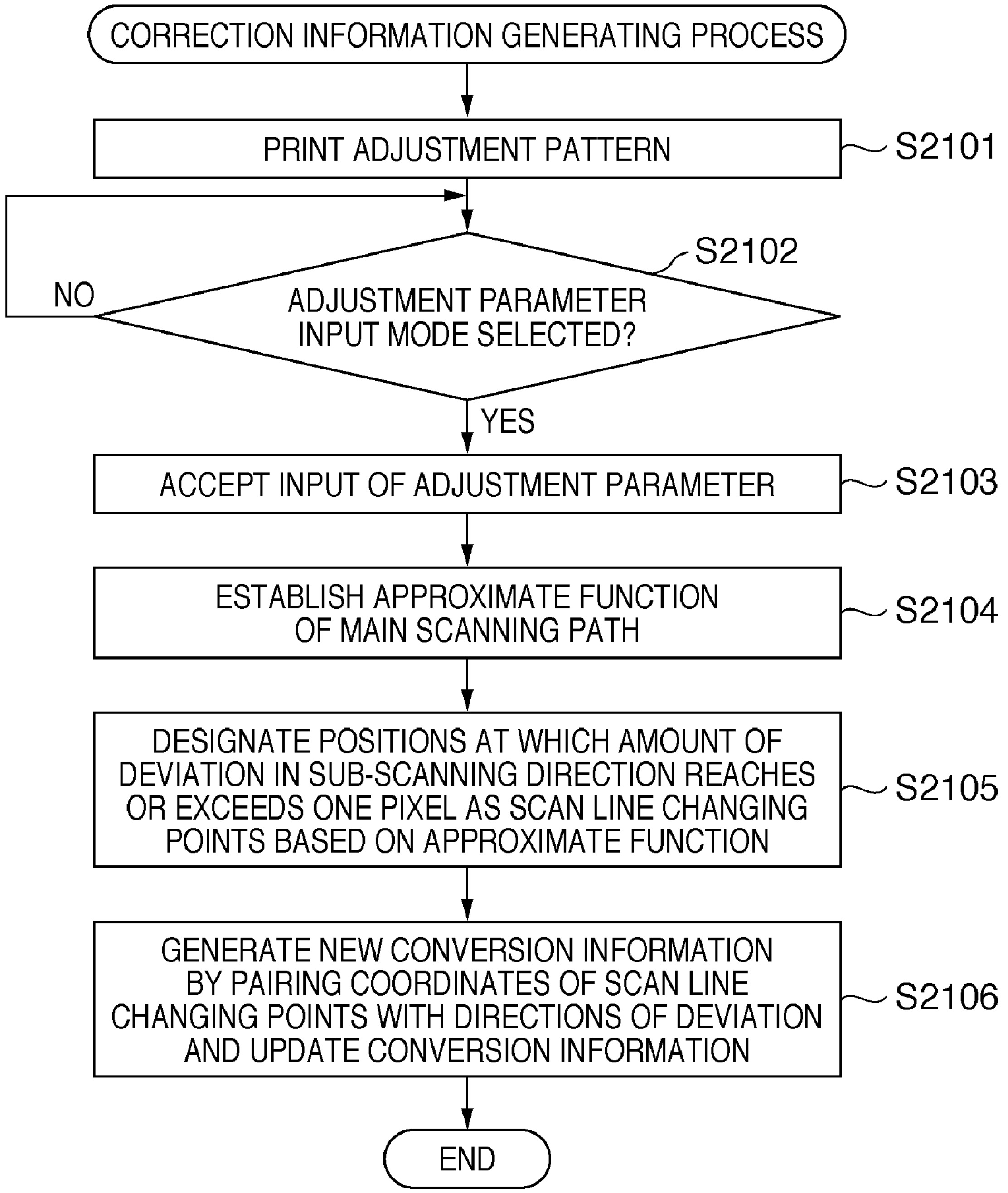
FIG. 21 is a flowchart of calibration procedures carried out by software running on a printing apparatus.

Calibration procedures for main scanning on the multicolor printing apparatus (e.g., color printer or color multi function peripheral) are as follows. Description will be given based on a flowchart of calibration procedures shown in FIG. 21. Incidentally, the procedures in FIG. 21 are carried out by the multicolor printing apparatus and do not include manual operation of the user.

(1) An operator supplies a sheet of paper on which a correction pattern has been printed to a paper feeder of the multicolor printing apparatus.

(2) The multicolor printing apparatus checks to ensure that the sheet with the correction pattern printed is placed on the paper feeder. Incidentally, regular printers cannot determine whether a correction pattern has been printed, and thus this step is omitted in the example of FIG. 21. Instead, when the sheet with the correction pattern printed is placed on the paper feeder, the user inputs a Start Calibration command in the multicolor printing apparatus. Consequently, the procedures in FIG. 21 are started and subsequent steps are carried out.

(3) The multicolor printing apparatus prints adjustment patterns over the correction pattern (S2101). In so doing, the multicolor printing apparatus does not correct the adjustment patterns for misregistration.

(4) The multicolor printing apparatus waits for a command to go into a scan mode in order to scan the sheet on which the correction pattern and adjustment patterns have been printed one over the other (S2102).

(5) The operator gives a command to go into a scan mode, by selecting an adjustment parameter input mode from a menu displayed on the user input unit 203 (YES in S2102).

(6) The operator reads intervals between the correction pattern and an adjustment pattern selected as required from among the adjustment patterns printed over the correction pattern. Then, the operator inputs the readouts at marker positions. Since there are multiple adjustment patterns, an appropriate adjustment pattern number is input together with correction values in the multicolor printing apparatus. The multicolor printing apparatus accepts the input readouts as an adjustment parameter (S2103).

(7) When the operator's input procedures are finished, the multicolor printing apparatus generates new conversion information based on the inputted adjustment parameter. For example, the multicolor printing apparatus converts the inputted amounts of deviation into actual amounts of pixel correction (S2104).

(8) The multicolor printing apparatus creates the conversion information based on the input adjustment parameter. Incidentally, the conversion information is also referred to as a conversion factor. The conversion information includes, for example, positions of scan line changing points for a scan line changing process as well as directions of the deviation at the positions. The created conversion information is stored in the register 208, a conversion information storage, by overwriting the old conversion information (S2105, S2106).

Steps (1) to (8) above are carried out during manufacture of the apparatus, after replacement of an optical part, or periodically. As a result, the conversion information is updated. Using the conversion information, the scan line changing process is performed to correct misregistration during generation of images other than the adjustment patterns. The scan line changing process is performed at the position of each scan line changing point according to the direction of deviation at the given position. A tone correction process is performed as well if necessary. In the above procedures described as being carried out by the "multicolor printing apparatus," a major role is played by the computing unit 204 and, in particular, the CPU or special-purpose hardware of the computing unit 204. Incidentally, when adjustment patterns are printed, the multicolor printing apparatus does not make corrections for misregistration based on the current conversion information.

Now, procedures for generating the conversion information in step (8) above will be described in more detail. Since markers are placed discretely on the adjustment pattern, an interpolation formula (approximate function) which approximates a scanning path is created. The approximate function represents displacement of a straight line object drawn by main scanning, from a straight line printed in advance on a recording medium and running in the main scanning direction. The approximate function provides a formula for calculating an amount of registration at an arbitrary position on a main scanning line. What is determined here, for example, is the positions of scan line changing points and the directions of deviation at these positions. The scan line changing points are located at such positions in the adjustment pattern that are displaced line by line in the sub-scanning direction with the position of the "Start mark" serving as a starting point. Therefore, the path of the adjustment pattern is reconstructed through interpolation based on the input adjustment parameter and each scan line changing point is determined such that the amount of deviation of the resulting image will be equal to or less than one line.

<Interpolation of the Adjustment Pattern>

Figure 20:
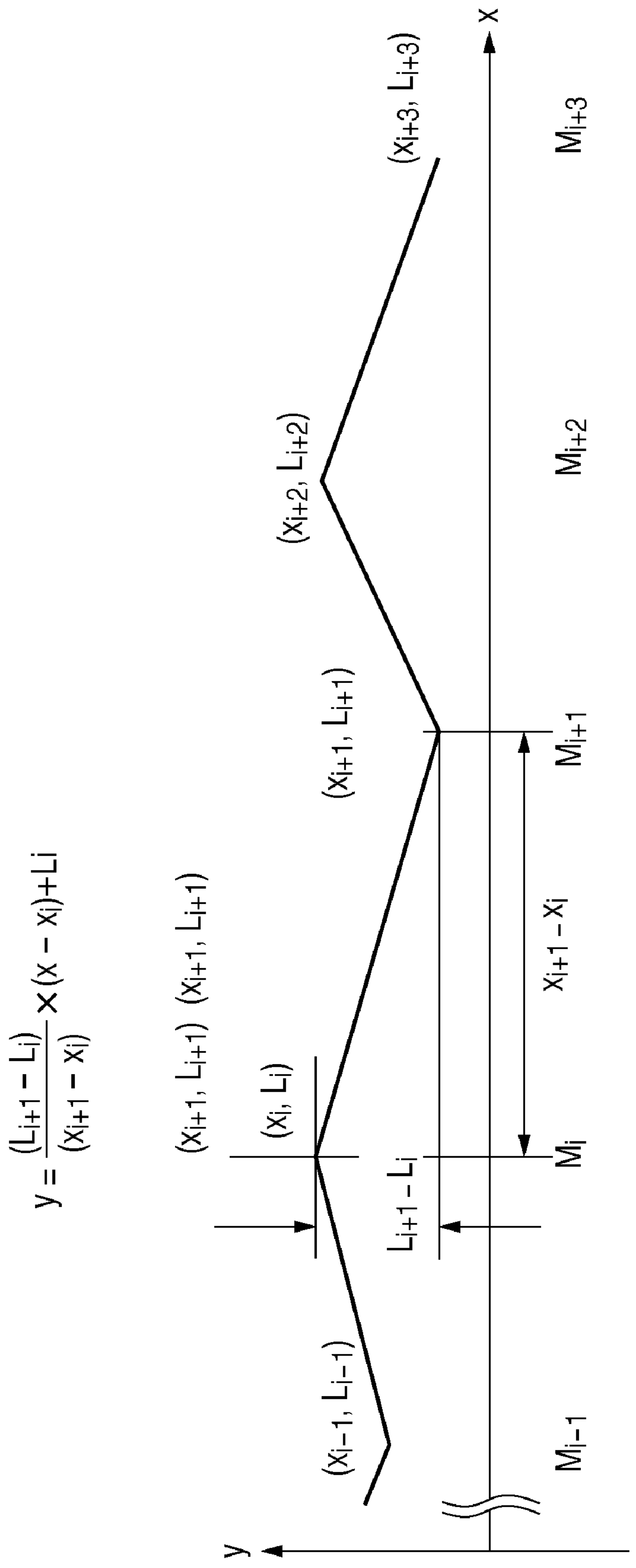
FIG. 20 is a diagram showing an example of how deviation of main scanning is calculated by interpolation.

The interpolation formula used to reconstruct the adjustment pattern excluding coefficients and constants is prepared in advance, for example, by interpolating the adjustment parameter. The input adjustment parameter is used as a parameter for the interpolation formula. The simplest interpolation formula is a linear interpolation formula obtained by joining the amounts of deviation at marker positions with polygonal lines. Let $x(0), x(1), x(2), x(3), \ldots, x(i)$ denote main scanning coordinates at the positions of markers 0 (Start), 1, 2, . . . , i and let $L(i)$ denote a value obtained by converting the adjustment parameter at the position of marker i into pixel count. The interpolated adjustment pattern is given by polygonal lines obtained by joining $(x(0), L(0))$, $(x(1), L(1))$, $(x(2), L(2))$, . . . . The amount of deviation y at coordinate x in each interval $[x(i), x(i+1)]$ is given by $y=(x-x(i))\times(L(i+1)-L(i))/(x(i+1)-x(i))+L(i)$. An example of this is shown in FIG. 20. The positions, in the sub-scanning direction, of the pixels arranged in one line are determined using the resulting interpolation formula. The positions of the pixels in the sub-scanning direction are measured in units of pixels as in the case of the positions in the main scanning direction, and thus a value smaller than one pixel is rounded off. Consequently, a path of a pixel row drawn by a single main scan is determined. The path is scanned beginning with a starting point (e.g., the left end), and a position coordinate in the main scanning direction when a position coordinate in the sub-scanning direction is shifted by 1 (i.e., one pixel) corresponds to a scan line changing point. The direction of shift corresponds to the direction of deviation at the scan line changing point. All pairs of a scan line changing point and direction of deviation which exist between start point and end point of a line drawn by the main scan provides conversion information (or conversion factor).

<Output Control by a Scan Line Changing Process>

Figure 19A:
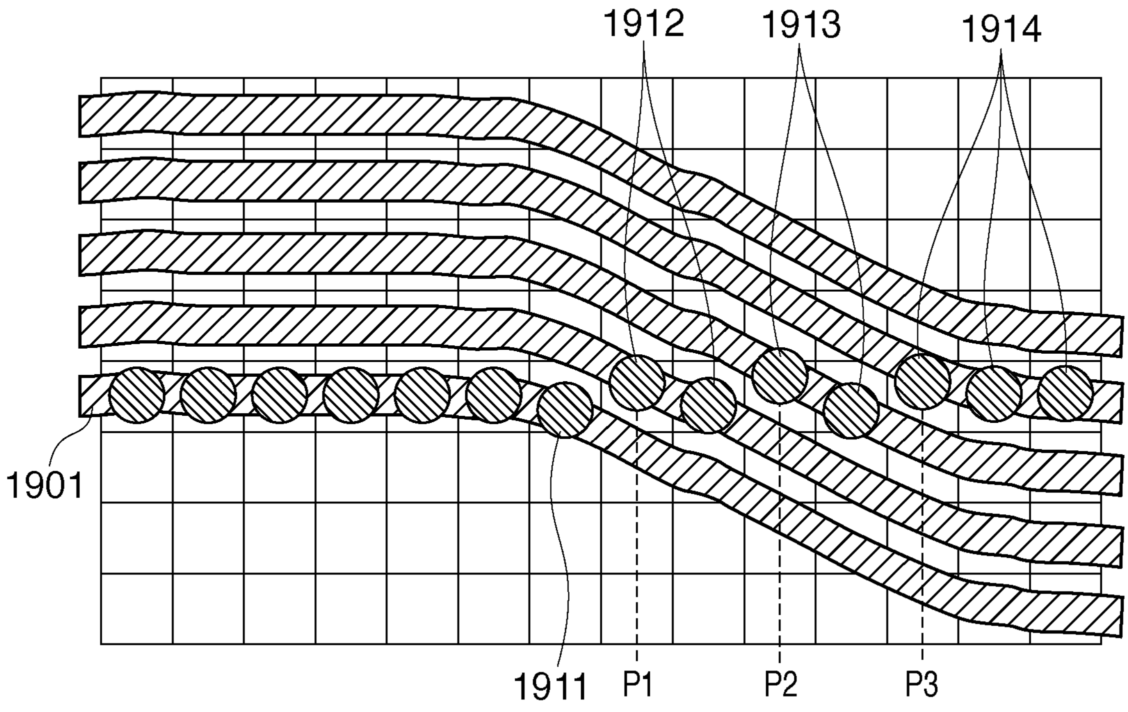
FIGS. 19A and 19B are diagrams showing an example of a scan line changing process.
Figure 19B:
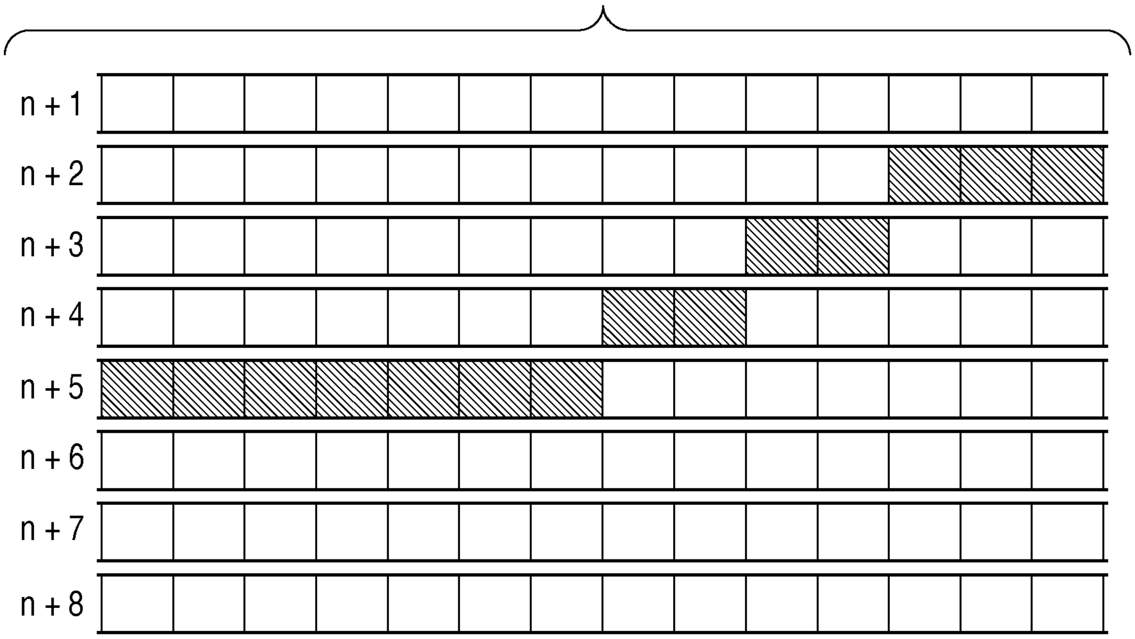

For a scan line changing process, with an apparatus in which an optical scanning line draws, for example, a distorted path 1901 on the photosensitive member shown in FIG. 19A, it is necessary to draw the pixel row which is closest to a horizontal straight line and represented by black dots by multiple scans instead of drawing a whole line by one scan. For example, it is necessary to draw pixels 1912 by a scanning line higher than a pixel 1911 by one line, draw pixels 1913 by a scanning line higher than the pixels 1912 by one line, and draw pixels 1914 by a scanning line higher than the pixels 1913 by one line. The row of these pixels draws a line closest to a horizontal straight line, that is, closest to an ideal main scanning line. That is, positions P1, P2, and P3 constitute scan line changing points. Therefore, a scan line changing process is performed in advance to shift a horizontal straight line image to different scan lines as shown in FIG. 19B in the image buffer. The conversion information used for correction is provided by hardware logic or an image conversion program mainly as information about coordinates to which scan lines are changed, that is, in the form of the above-described pairs of a scan line changing point and direction of deviation, for example. The generated image information is shifted based on the conversion information and is outputted as an image in which optical distortion has been corrected. Image control means performs output control in this way during image generation.

Description will be given citing a concrete example. Coordinates for scan line changing are determined using the interpolation formula described above. For example, to change a scan line when deviation of the scan line reaches or exceeds 0.5 pixel, assuming that the main scanning direction corresponds to an X axis and that the sub-scanning direction corresponds to a Y axis, points of intersection of an interpolation curve (i.e., approximate function) with points Y=±0.5, ±1.5, ±2.5, ±3.5, ±4.5, . . . are determined. A range of Y in which intersection points are determined are established in advance. Since misregistration of the main scanning line paths fall within design tolerances, it is sufficient to determine intersection points within the tolerances. Then, main scanning coordinates are arranged in ascending order, to obtain new conversion information. This method produces the same results as a method which determines positions, in the sub-scanning direction, of all the pixels on a single line, but requires less time. A coefficient is determined in such a way as to apply coordinate correction of opposite sign to cancel skewing of optical scanning tracks represented by the interpolation formula.

Although interpolation in the above example is linear, a spline function which links adjustment parameters may alternatively be used for approximation. Even in that case, points of intersection with points Y=±0.5, ±1.5, ±2.5, ±3.5, ±4.5, . . . are determined as scan line changing points included in the conversion information.

Conversion information can be created according to the above procedures and misregistration can be corrected using the created conversion information. The adjustment parameter which serves as a basis for the conversion information can be printed and input at the user site. Consequently, misregistration which varies from apparatus to apparatus and changes over time can be corrected appropriately at low costs, making it possible to print high quality images.

Second Embodiment

Figure 5:
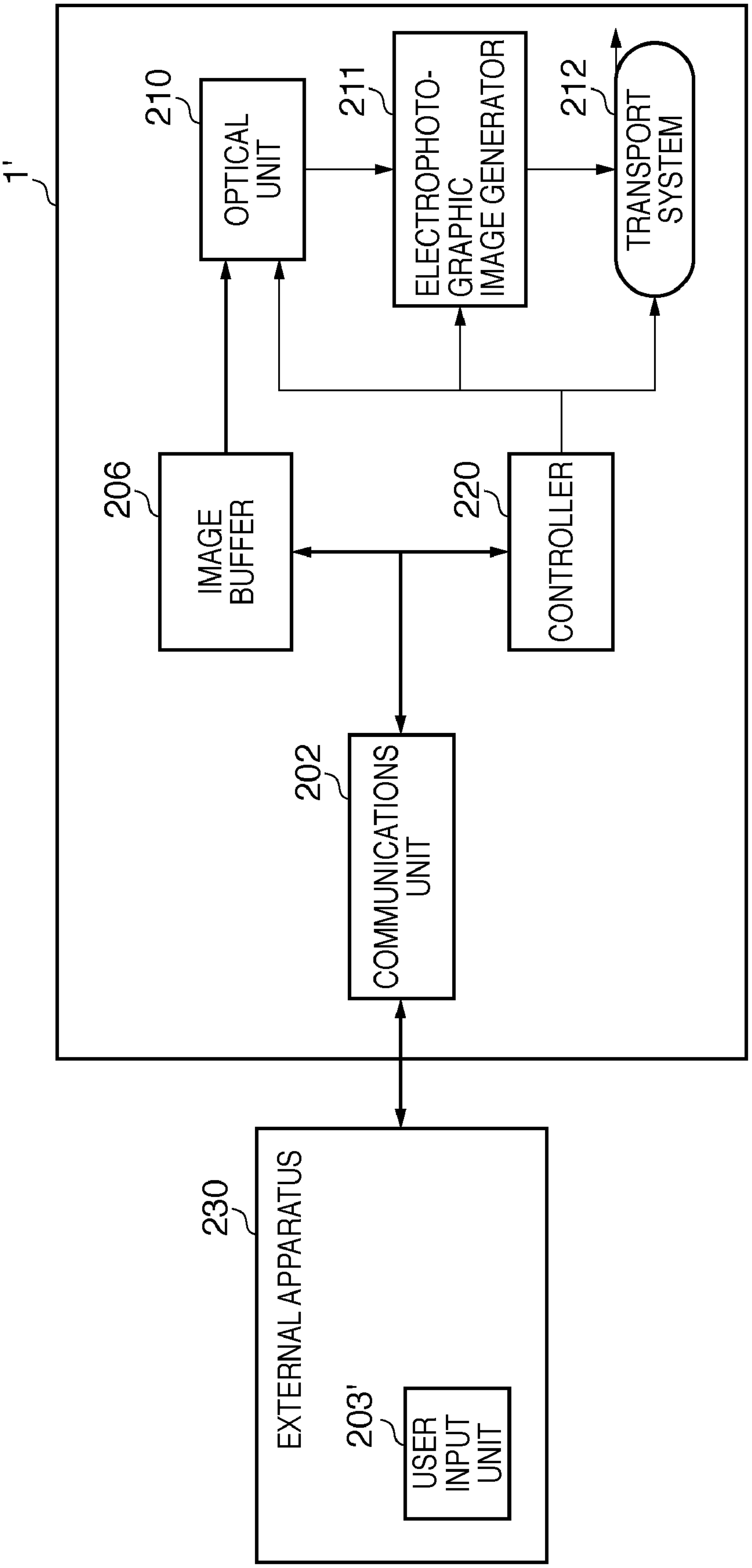
FIG. 5 is a diagram showing an exemplary configuration of another multicolor printing apparatus.

Depending on the configuration of the multicolor printing apparatus, most parts of data processing are performed by software running on an external apparatus. An example is shown in FIG. 5. Built-in functions of a multicolor printing apparatus 1' include a communications unit 202 used for communications with an external apparatus 230, an input/output buffer (image buffer) 206, a console (not shown), and a small-scale controller 220 for use to drive mechanical parts of the multicolor printing apparatus according to predetermined procedures. The input/output buffer (image buffer) 206 is intended to absorb instability during communications. The console is used by the operator to input commands. The controller 220 includes a status reader which reads status detected by a sensor or the like. Mechanical parts include an optical unit 210, electrophotographic image generator 211, and transport system 212. In this configuration, skew correction and other image processing as a whole are implemented by software running on the external apparatus.

Figure 6:
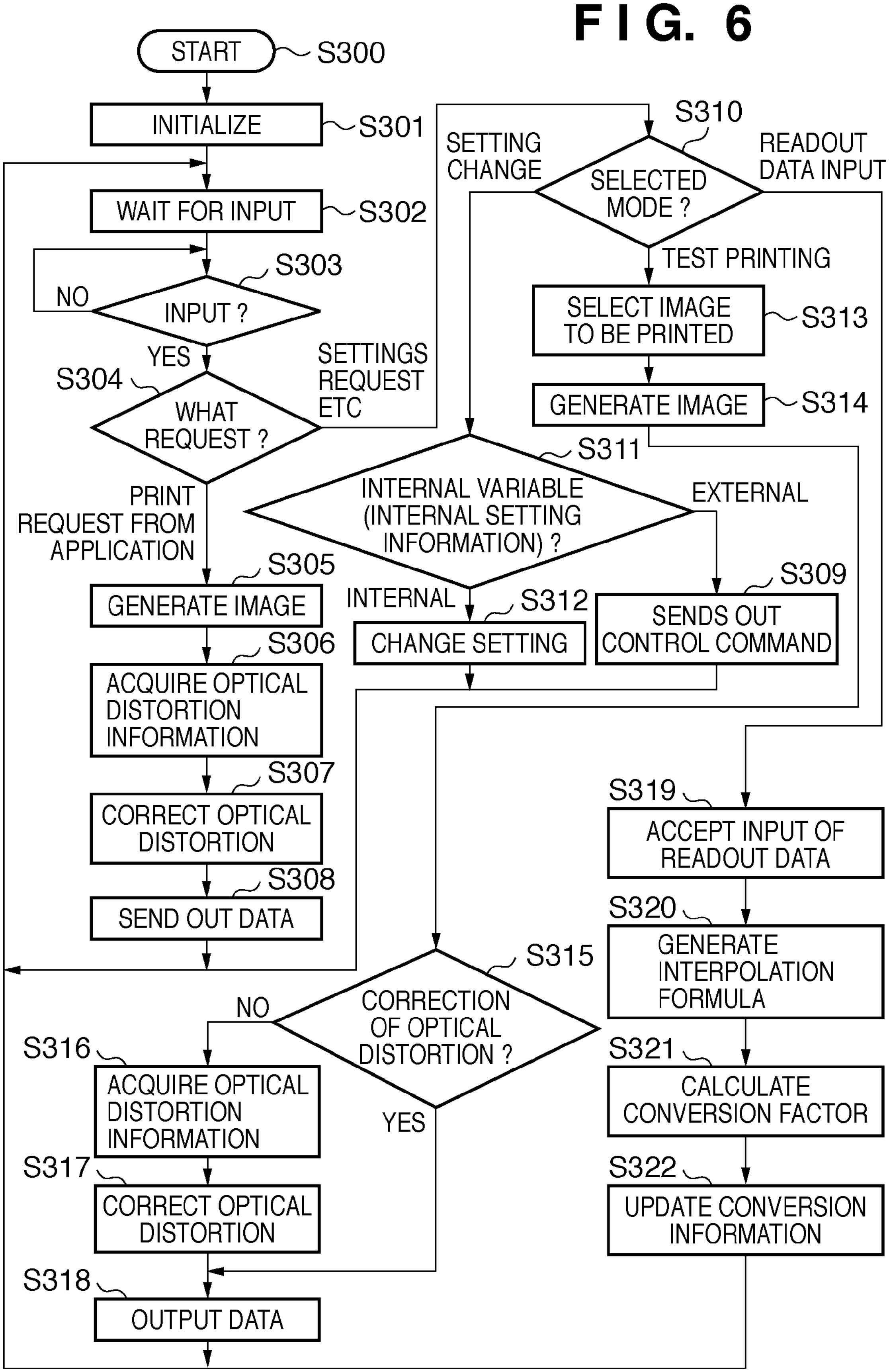
FIG. 6 is a flowchart of calibration procedures carried out by software running on an external apparatus.

FIG. 6 shows an exemplary configuration according to the present embodiment implemented by software running on an external apparatus. The external apparatus is an apparatus, such as a personal computer, equipped with a CPU capable of executing programs. Broadly speaking, the software running on the external apparatus has at least two modes of operation: image generating operation which involves generating print data at a request of another application, based on print information supplied from the other application, and setting operation which involves making various operation settings for the image generating operation and multicolor printing apparatus. The operation settings involve changing various set values for image generation. This is done by changing coefficients in the software. Settings related to printing mechanisms are made by the multicolor printing apparatus via communications means. Furthermore, the multicolor printing apparatus generates print data by itself to diagnose itself. The print data may be information about details of settings or image samples for test printing or calibration according to the present invention or the like. According to the present embodiment, the adjustment parameter is read by the user or apparatus from an adjustment pattern printed by the multicolor printing apparatus and inputted in an external apparatus such as a computer. The external apparatus generates conversion information based on the adjustment parameter and performs a scan line changing process using the conversion information. That is, according to the present embodiment, correction processes such as the line changing process are performed by the external apparatus which also saves and updates the conversion information for the correction processes while the multicolor printing apparatus only prints out corrected images.

Referring to FIG. 6, after startup, a conversion information update program initializes the printing mechanisms and image generation coefficients (S301) and waits for input (S302-S303). In Step S304, when there is an input from another application or via a user interface, the flow branches depending on whether the input is related to a printing operation or setting operation.

If the input is a print request, the program generates an image by interpreting a print command based on the request from the application (S305) and corrects the generated image for optical distortion (S307) based on optical distortion information acquired in Step S306. The correction includes the scan line changing process and tone correction process. The program sends out the corrected image data to the multicolor printing apparatus via the communications means to produce a printout (S308).

On the other hand, if it is found in Step S304 that the input is related to a setting operation or the like, the flow branches to Step S310 to determine a selected mode. Modes available for selection include a request to change setting to other than output from the application, a request for other test printing or the like, and adjustment parameter input. If it is determined in Step S310 that the selected mode is the setting change mode, the program goes to Step S311 to determine whether the setting change is related to an internal variable in the external apparatus, that is, the computer, or to a setting value (external setting) such as paper selection in a printing unit. If the setting change is related to an internal setting, the program changes specified information (S312) and returns to a wait-for-input state. If the setting change is related to an external setting, the program sends out a control command to the multicolor printing apparatus via the communications means (S309). The printing apparatus changes the specified setting.

On the other hand, if it is determined in Step S310 that the selected mode is the test printing mode, the flow branches to Step S313. Test print patterns includes the adjustment pattern according to the present invention. Thus, if multiple patterns including the adjustment pattern are available for test printing, the user is allowed to further specify a pattern out of the available patterns (S313). After the user selects a test pattern to be printed, the program reads image data of the selected pattern from stored patterns and generates print data (S314).

After the image is generated, the program determines whether the output image is used for correction of optical distortion according to the present invention or for another purpose (S315). This determination is made whether or not the specified pattern is an adjustment pattern. If the specified pattern is not an adjustment pattern, the program acquires information about optical distortion as in the case of a print request from the application (S316), corrects distortion (misregistration) (S317), and sends out data (S318).

When the adjustment pattern according to the present invention is printed, the program outputs image data of the adjustment pattern directly to the printing apparatus, skipping correction of optical distortion, which is unnecessary (S318).

If it is determined in Step S310 that readout data input mode unique to the present invention has been specified, the program accepts input of an adjustment parameter from user input means such as a keyboard or user interface of the external apparatus (S319). Then, the program generates an interpolation formula (S320), calculates new conversion information using the interpolation formula (S321), overwrites the conversion information in appropriate storage means of the external apparatus with the calculated values (S322). All copies of the conversion information actually used are updated as well (S322). Steps S319 to S322 are similar to Steps S2103 to S2106 in FIG. 21.

Through the above procedures, conversion information is updated to correct optical distortion anew, making it possible to obtain a distortionless printed output image regardless of parts replacement or changes over time.

Regarding whether to implement components using physical electronic circuits or software, there are various intermediate combinations. The components implemented by software can be installed on the external apparatus and are included in the concept of the first and second embodiments.

Third Embodiment

Depending on paper feed accuracy of a paper transport mechanism of the multicolor printing apparatus, the transport mechanism may transport printing paper in an inclined state instead of transporting it accurately. In the case of new printing on unpatterned paper, a slight inclination does not present practical problems, but when a plurality of printed patterns are handled as with the calibration procedures according to the present invention, even a very small inclination poses a problem. Depending on the inclination, it becomes difficult to accurately read an amount of skew caused by optical distortion of optical scanning.

Thus, according to the present embodiment, a detection pattern is added to the correction pattern and adjustment pattern to detect transport skew. When transport skew is detected, calibration procedures are carried out anew.

Figure 7:
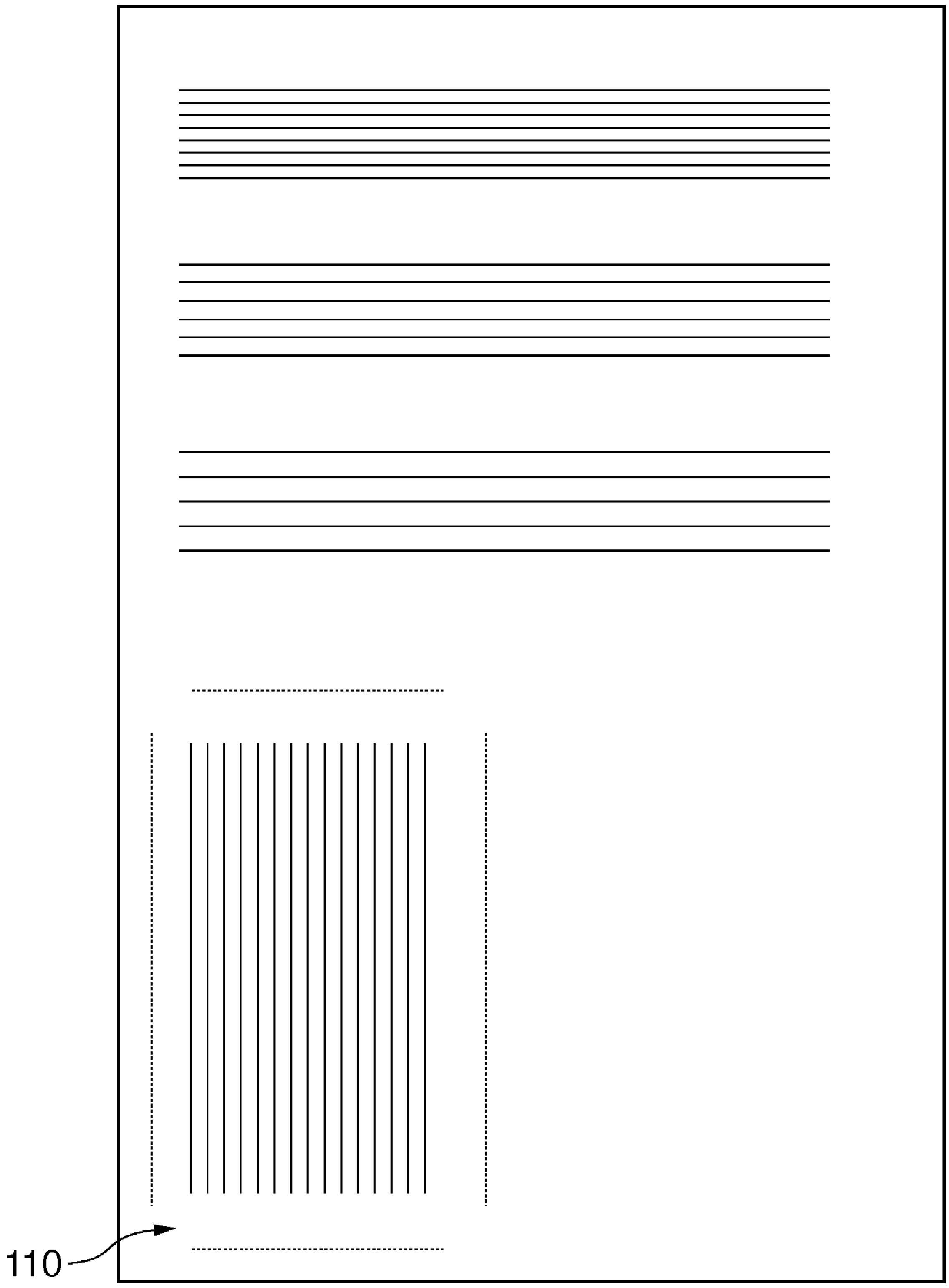
FIG. 7 is a diagram showing an exemplary correction pattern.
Figure 8:
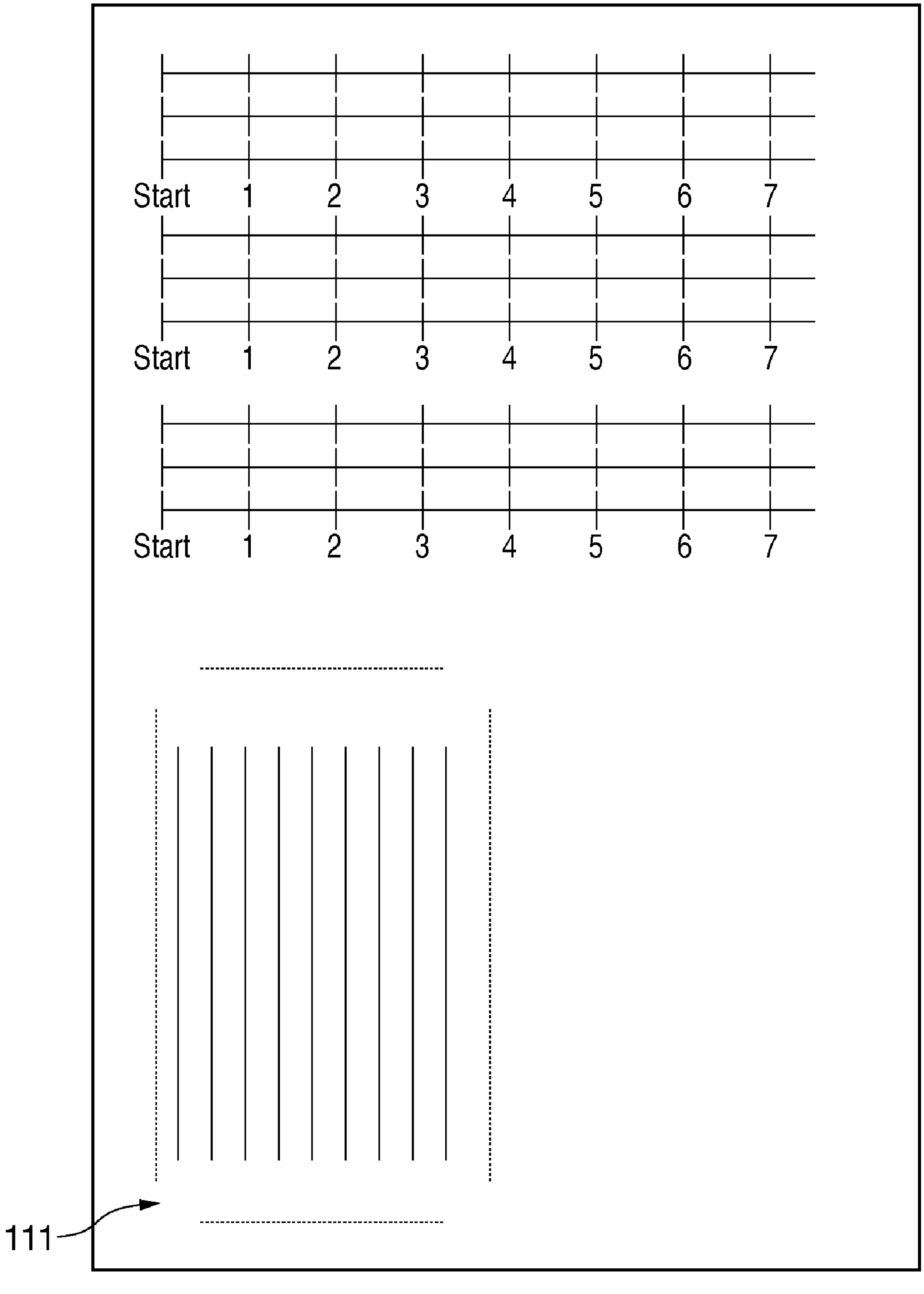
FIG. 8 is a diagram showing an exemplary adjustment pattern.

FIG. 7 shows a correction pattern to which an inclination reference pattern 110 has been added to detect transport skew while FIG. 8 shows an adjustment pattern to which an inclination detection pattern 111 has been added. The inclination reference pattern and inclination detection pattern are located at corresponding positions (where inclination is detected). Both patterns are made up of a group of parallel vertical lines placed at equal intervals. An optical scanning beam and image delivery are synchronized using a detection signal as a synchronizing signal, where the detection signal is generated when light for uniform optical scanning is detected by an optical sensor installed at a predetermined position. Since the position of the optical sensor is fixed, straight lines in the sub-scanning direction orthogonal to the direction of optical scanning do not get distorted and printed as straight lines along the sub-scanning direction even on a printing apparatus in which an optical scanning plane is distorted causing misregistration.

Figure 9A:
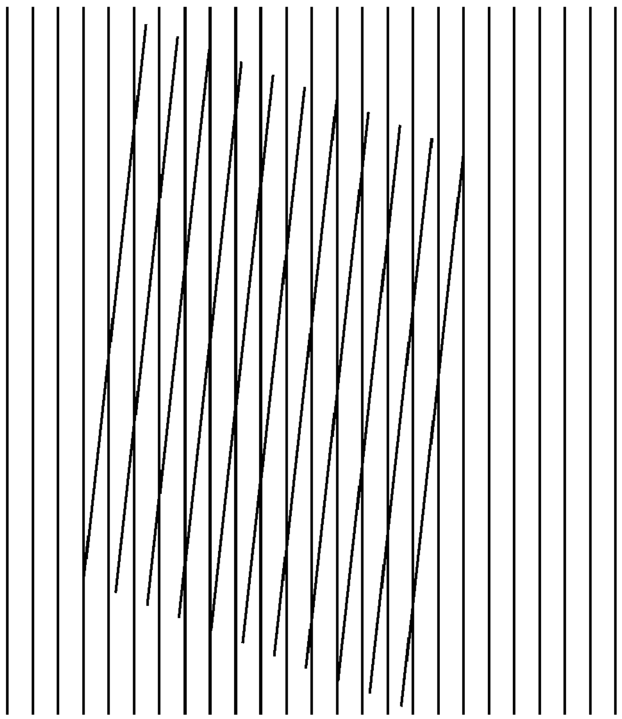
FIGS. 9A and 9B are diagrams showing examples in which an adjustment pattern is superimposed over a correction pattern.
Figure 9B:
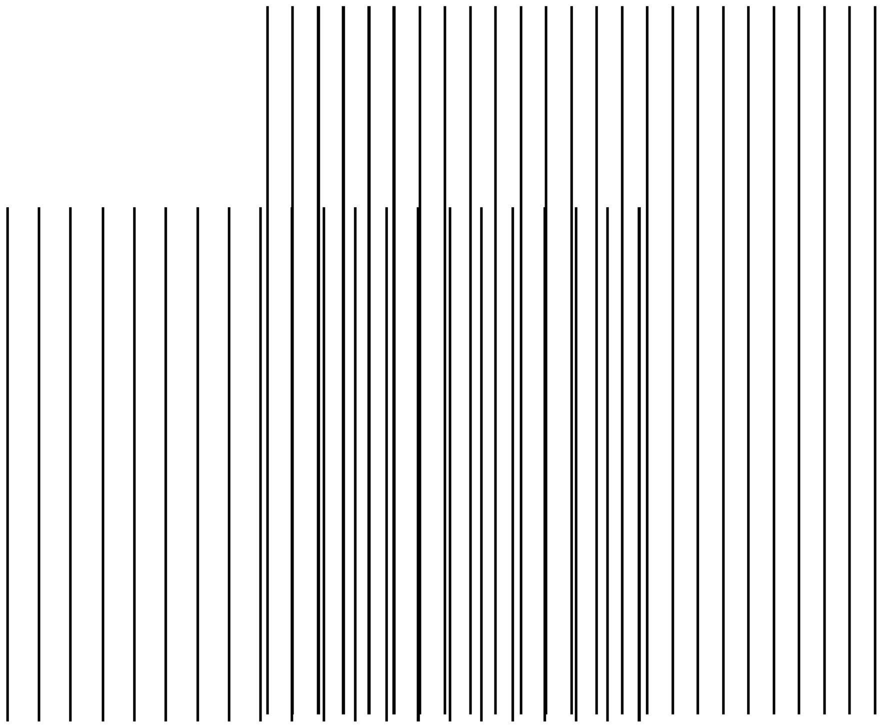

When the adjustment pattern and inclination detection pattern are printed over the correction pattern and inclination reference pattern printed on paper in advance, the correction pattern being parallel to the main scanning direction and the inclination reference pattern being perpendicular to the main scanning direction, the inclination reference pattern and inclination detection pattern are printed overlapping each other. Therefore, if the direction of transport is orthogonal to the main scanning direction, the lines in the inclination reference pattern and inclination detection pattern do not intersect each other as shown in FIG. 9B although there is line density variation in the main scanning direction. On the other hand, if the direction of transport is skewed, the inclination reference pattern and inclination detection pattern intersect each other and a moire interference pattern is observed as shown in FIG. 9A. In this way, based on whether moire is detected by an inclination detector, it is possible to visually identify skew feeding of paper and thereby check the paper for inclined transport.

Thus, if a sheet is skewed, instead of reading the adjustment parameter from the given sheet, the user reads the adjustment parameter from patterns printed on another sheet. The rest of the procedures are the same as in the first or second embodiment.

Fourth Embodiment

In the third embodiment, if the calibration procedures are carried out anew each time inclination of transport is detected, sheets with the adjustment pattern printed is wasted until there is no longer inclination of transported paper. This is not desirable in terms of time and cost. Thus, the present embodiment uses an inclination detection pattern which represents skew information about inclination of transport in addition to measuring the amounts of optical distortion using the correction pattern and adjustment pattern superimposed one on the other. An amount of inclination observed in an adjustment pattern scan command mode is read additionally and taken into consideration in the calculation of conversion information to calculate coefficient information by canceling the effect of the inclined transport.

In this example, a plurality of inclination reference patterns are printed on the adjustment pattern by slightly varying the inclination angle among the patterns. That is, the inclination reference patterns, each of which contains a group of parallel lines, vary slightly in angle from one another. This makes it possible to detect the amount of inclination. For example, the pattern free of moire corresponds to the inclination angle of paper transport. Thus, identification information about the patterns is inputted together with the adjustment parameter into the printing apparatus (in the case of the first embodiment) or external apparatus (in the case of the second embodiment). When conversion information is calculated, a coordinate transformation is applied to coordinate values which represent marker positions contained in the adjustment parameter and the amounts of deviation (i.e., distortion values of optical scanning) at the marker positions to rotate the coordinate values in the direction opposite to the inclination of paper by an angle equal to the inclination angle, thereby correcting the inclination of transport.

Figure 10:
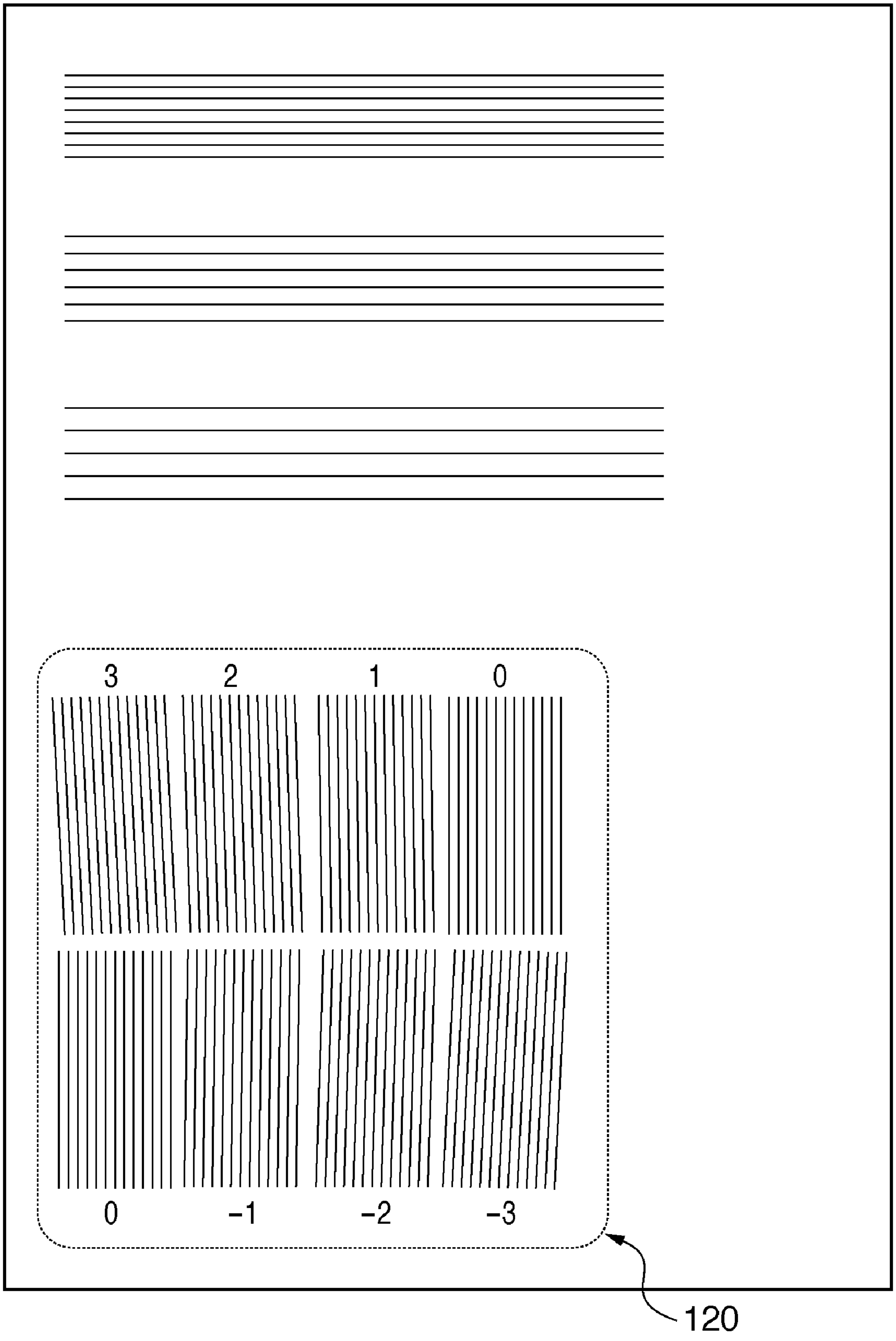
FIG. 10 is a diagram showing an exemplary correction pattern.

FIG. 10 shows an exemplary correction pattern according to the embodiment of the present invention. A transport inclination reference pattern 120 to be added is also printed. The inclination reference pattern 120 contains a parallel line group orthogonal to the correction pattern as well as a plurality of parallel line groups which differ little by little in inclination angle from the parallel line group orthogonal to the correction pattern. The adjustment pattern is the same as the one shown in FIG. 8. However, since the inclination detection portion printed together with the adjustment pattern has a large area, the inclination detection pattern 111 is printed in an accordingly large area.

When the correction pattern is transported in an inclined state, although oblique moire does not occur in the parallel line groups which coincide in inclination with the direction of transport, oblique moire occurs in the other parallel line groups which differ in inclination from the direction of transport. The inclination of the paper can be determined as an amount of rotation from the inclination angle of the parallel line groups not subjected to oblique moire. A correspondence table between name labels (3, 2, 1, 0, −1, −2, −3 in the case of FIG. 10) and actual inclination angles is prestored in a storage of the printing apparatus or external apparatus. The user selects a parallel line group not subjected to moire and inputs its name (identifier) as slope angle information into the printing apparatus or external apparatus. The printing apparatus or external apparatus determines the inclination angle of the paper using the above correspondence table.

Figure 11:
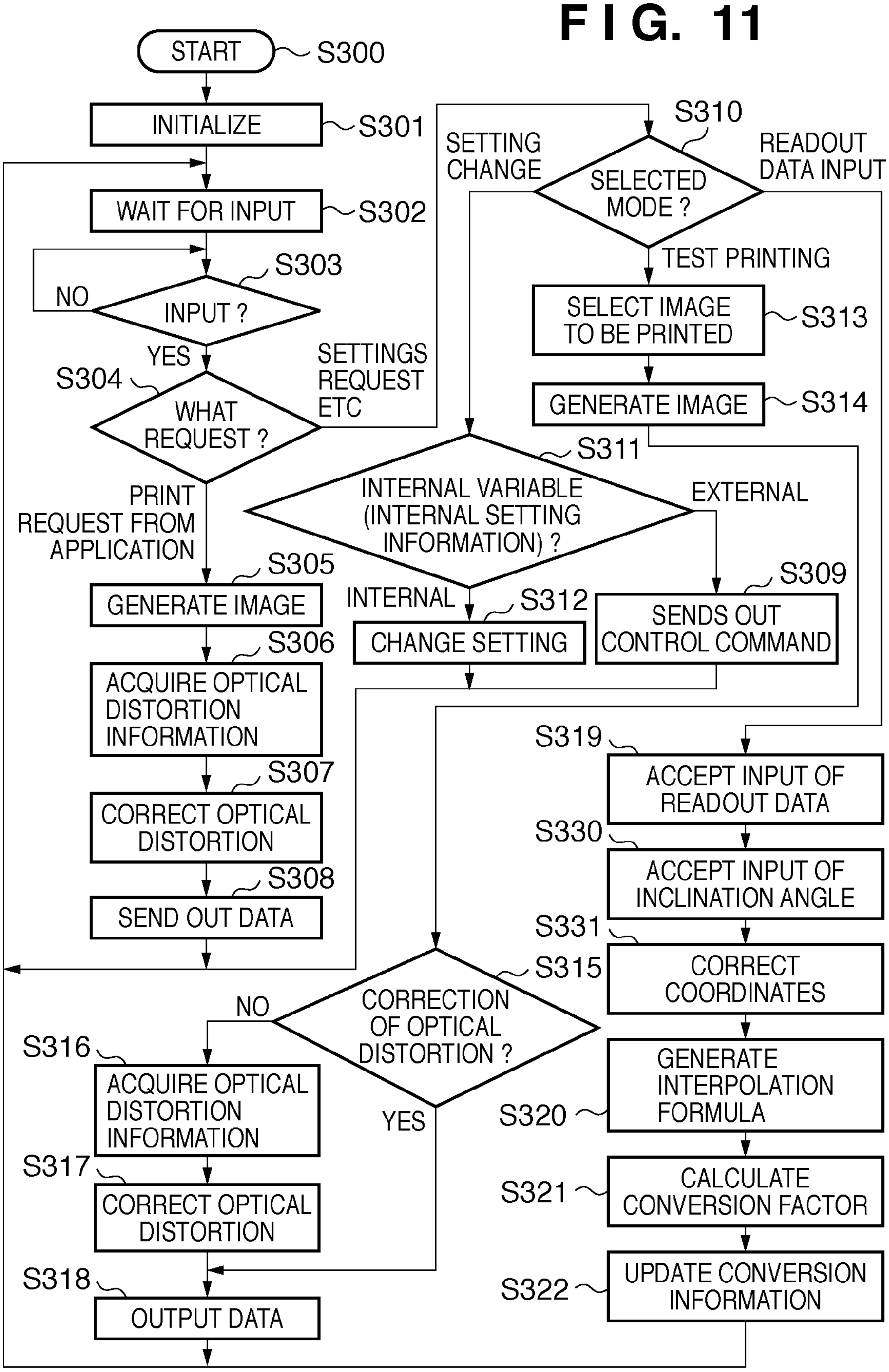
FIG. 11 is a flowchart of calibration procedures carried out by software running on an external apparatus.

FIG. 11 shows a flowchart of procedures carried out by the software according to the present embodiment. Description of steps in common with FIG. 6 will be omitted. According to the present embodiment, the flowchart includes additional steps: a step (S330) of additionally reading information about the inclination angle of transport in the adjustment parameter input mode and a step (S331) of performing a rotational transform of a scan position coordinate system based on the information about the inclination angle. A correction is made by subjecting an angle formed by the correction pattern and adjustment pattern during inclined transport to a rotational transform with respect to marker positions resulting from a coordinate transformation and input values of the amounts of deviation at the marker positions. An interpolation formula is generated based on input values obtained after the correction. Generation of the conversion information and subsequent steps are the same as in FIG. 6.

The rotational transformation may be centered at any position. For example, a marker position at which the amount of deviation is 0 may be selected and used as a reference. Also, an inclination, if any, is usually minimal and the adjustment pattern which is inclined runs almost along the main scanning direction (Y axis), and thus it will be practically sufficient to correct only a component in the sub-scanning direction (X axis). Now, let (x, y) denote the amount of deviation at the marker position, that is, the coordinates of the adjustment pattern before the correction, let (x', y') denote the amount after the correction, and let θ denote a rotation angle. Then, (x', y') can be approximated by $x'=x+y\cdot\tan\theta$, $y'=y$. This level of correction will be sufficient, considering that the inputted amount of deviation, that is, the value of x, is an approximate value read by the user. Of course, the y component may be corrected more accurately. This conversion process is performed in Step S331 in FIG. 11.

Fifth Embodiment

The task of reading intervals between the correction pattern serving as a horizontal reference and adjustment pattern containing optical distortion involves discriminating finely printed patterns and is not necessarily an easy task. The present embodiment offers a correction operation using an easier-to-read correction pattern and adjustment pattern based on moire which occurs between periodic patterns. However, the present embodiment can detect optical distortion only when an optical scanning plane is straight and inclined only in a simple manner. The present embodiment is not applicable to correction of tracks with a skewed scanning plane.

Figure 12:
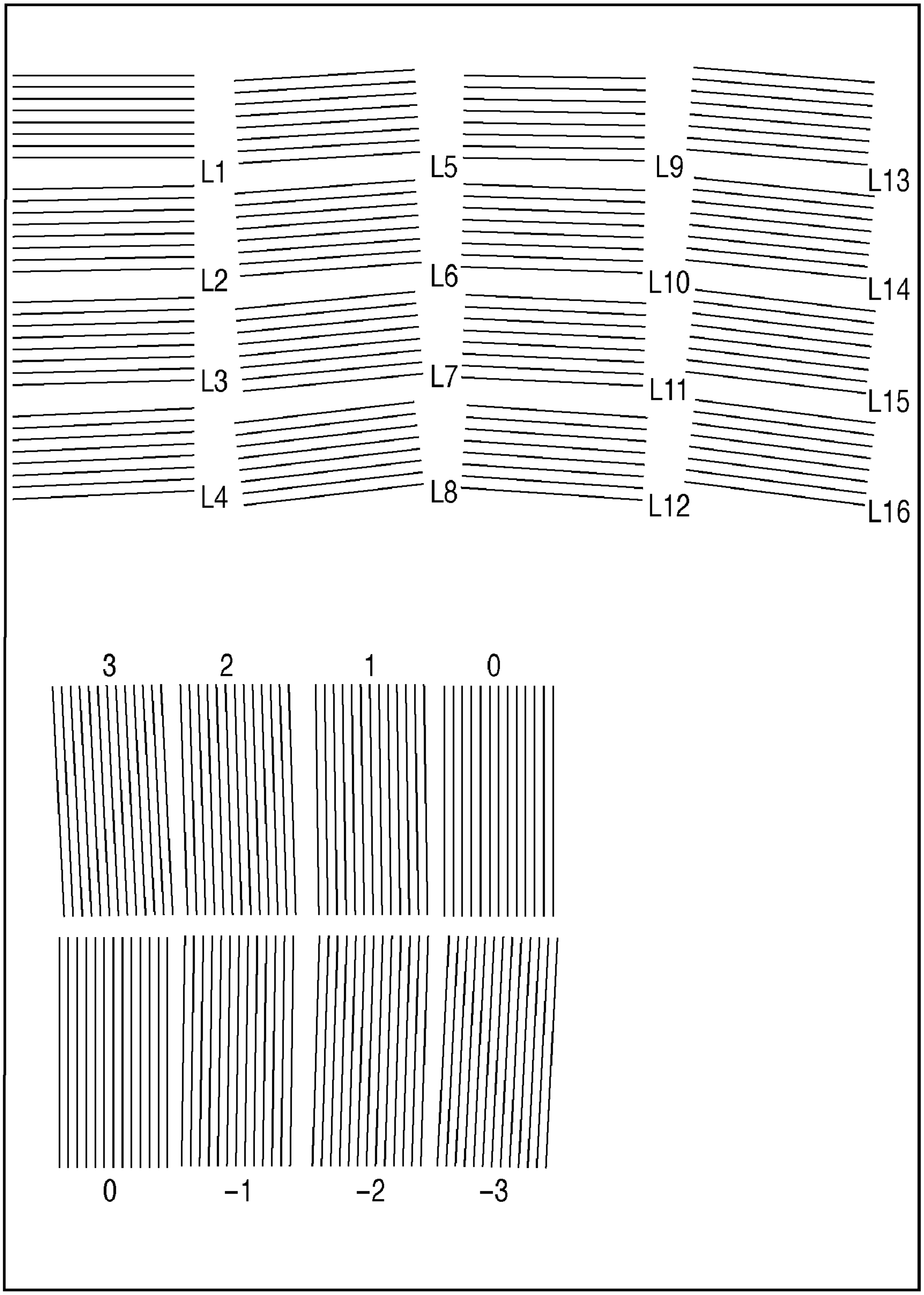
FIG. 12 is a diagram showing an exemplary correction pattern.

FIG. 12 shows an exemplary correction pattern according to the present embodiment. The correction pattern contains a plurality of parallel line groups L1 to L16 which differ little by little in inclination angle. Name labels L1 to L16 are attached to the respective parallel line groups for ease of input.

Figure 13:
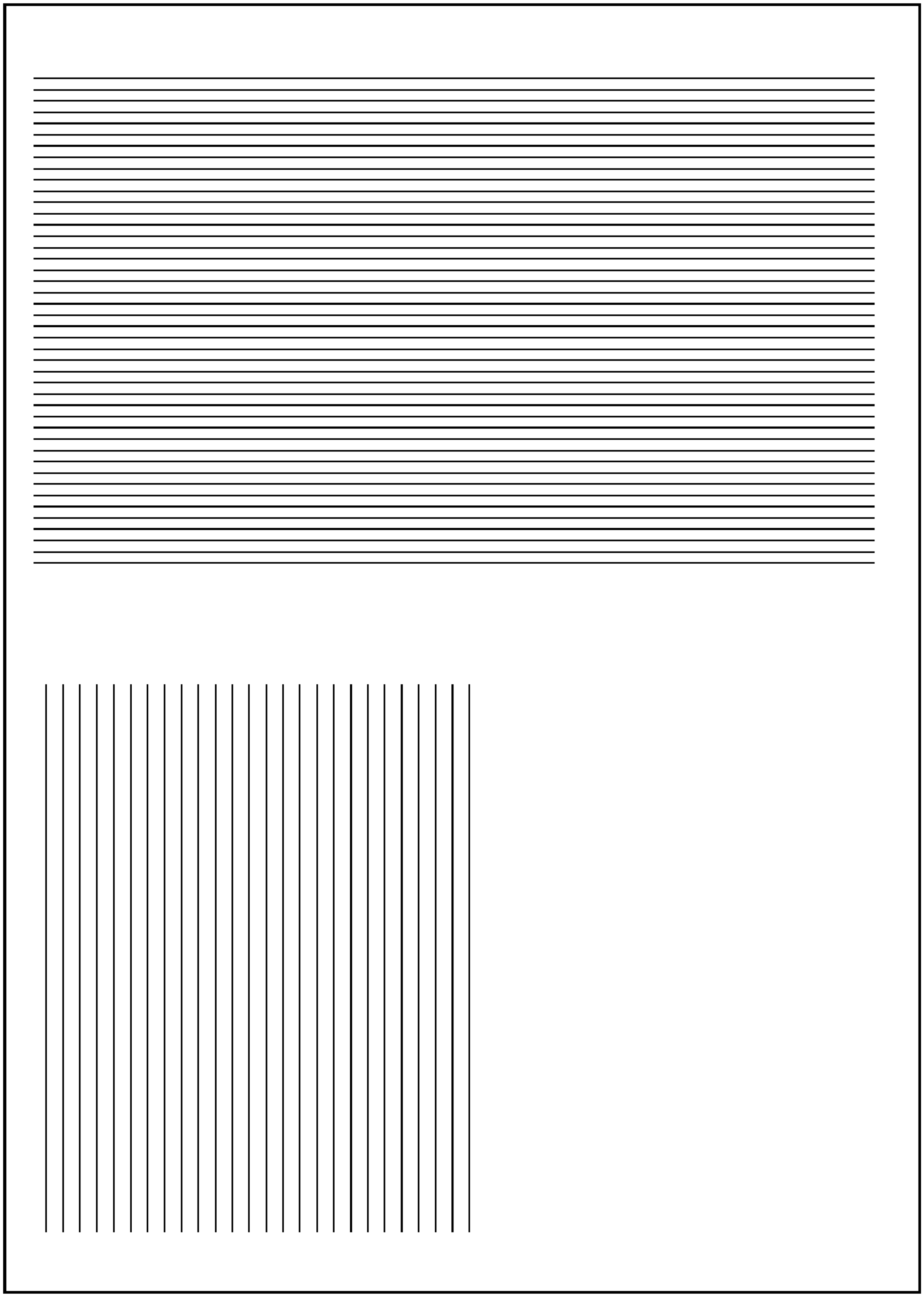
FIG. 13 is a diagram showing an exemplary adjustment pattern.

FIG. 13 shows an exemplary adjustment pattern according to the present embodiment. A print range of the adjustment pattern stretches in such a way that the adjustment pattern will be superimposed over the parallel line groups of the correction pattern. Also, since input means is simplified and is only used to select name labels, markers are omitted. According to the present embodiment, a sheet with the correction pattern printed is supplied to the printing apparatus and the adjustment pattern is printed over the correction pattern.

Figure 14:
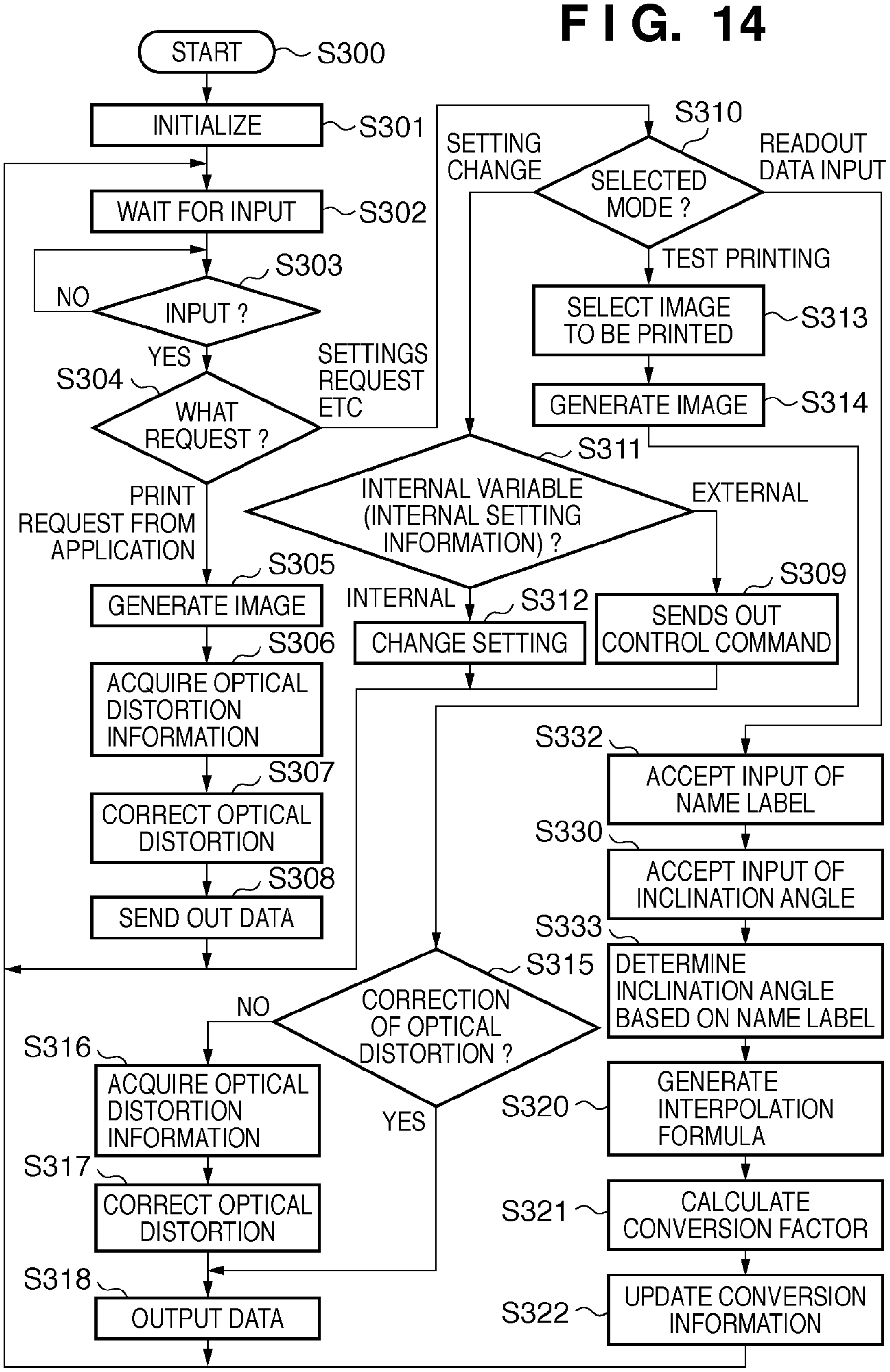
FIG. 14 is a flowchart of calibration procedures carried out by software running on an external apparatus.

FIG. 14 shows a flowchart of procedures carried out by the software according to the present embodiment. Compared to FIG. 11, readout data input procedures are simplified to a name label selection/input operation (S332) by which a name label of the correction pattern is read. In this operation, the user selects a correction pattern free of moire and enters its name. A correspondence table between name labels and actual inclination angles is prepared in advance, and the inclination angle is determined based on the input name of the correction pattern (S333). According to the present embodiment, distortion of optical scanning is determined in a simplified manner using the inclination angle from a horizontal plane. An interpolation formula is determined automatically for the inclination angle θ. If θ1 denotes an angle obtained based on the inputted name of the correction pattern and θ2 denotes an angle corresponding to the input label of a selected inclination reference pattern, the inclination of the main scanning lines is determined by subtracting θ2 form θ1, that is, θ1−θ2. Thus, in this example, of the coordinate values (x', y') after the correction, the component x' in the sub-scanning direction is corrected to $x'=y\cdot\tan(\theta 1-\theta 2)+x$. The component y in the main scanning direction remains unchanged.

This makes it possible to omit the task of visually reading the amounts of deviation at marker positions and thereby improve operability and accuracy.

Sixth Embodiment

Figure 15:
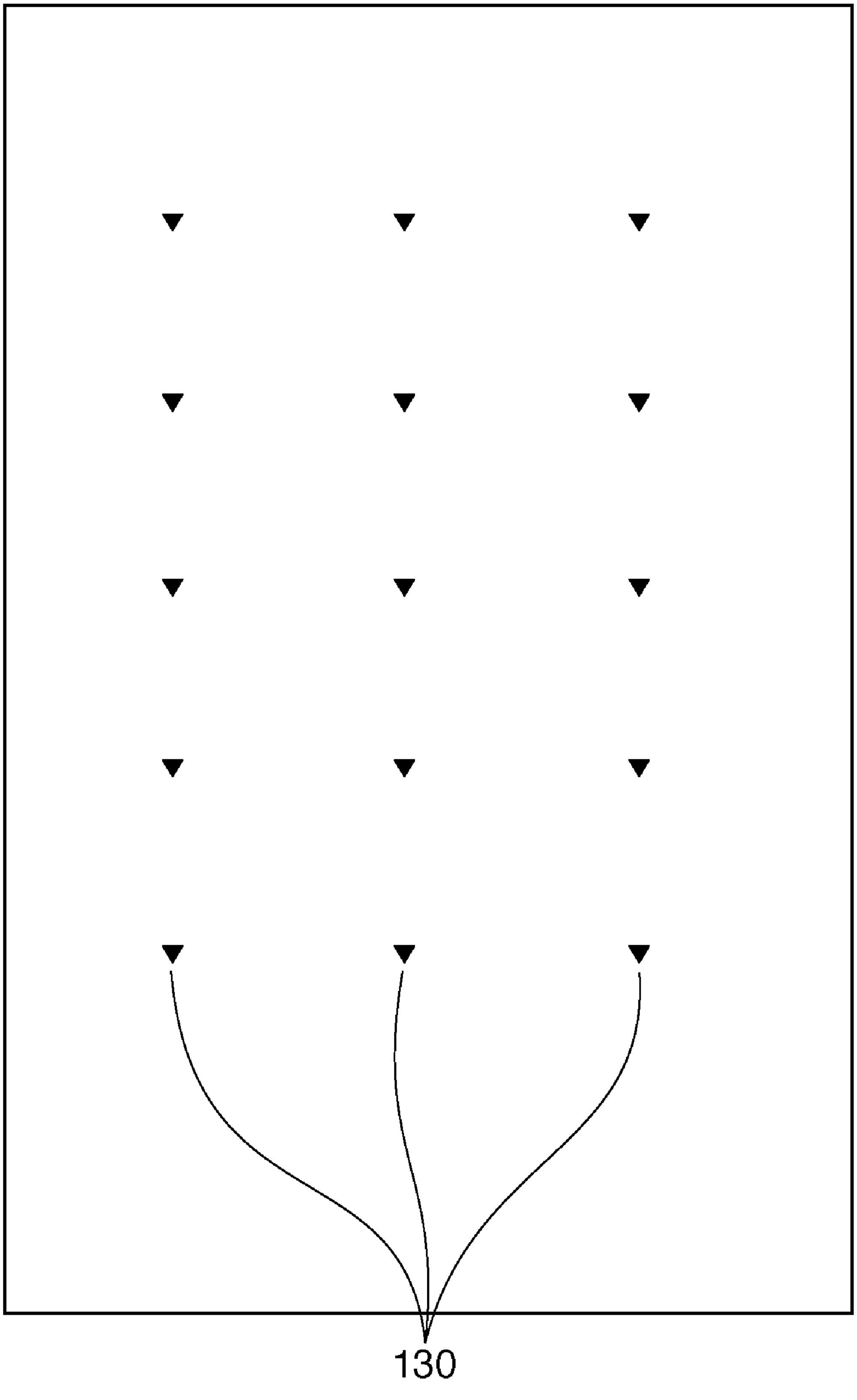
FIG. 15 is a diagram showing an exemplary correction pattern.
Figure 16:
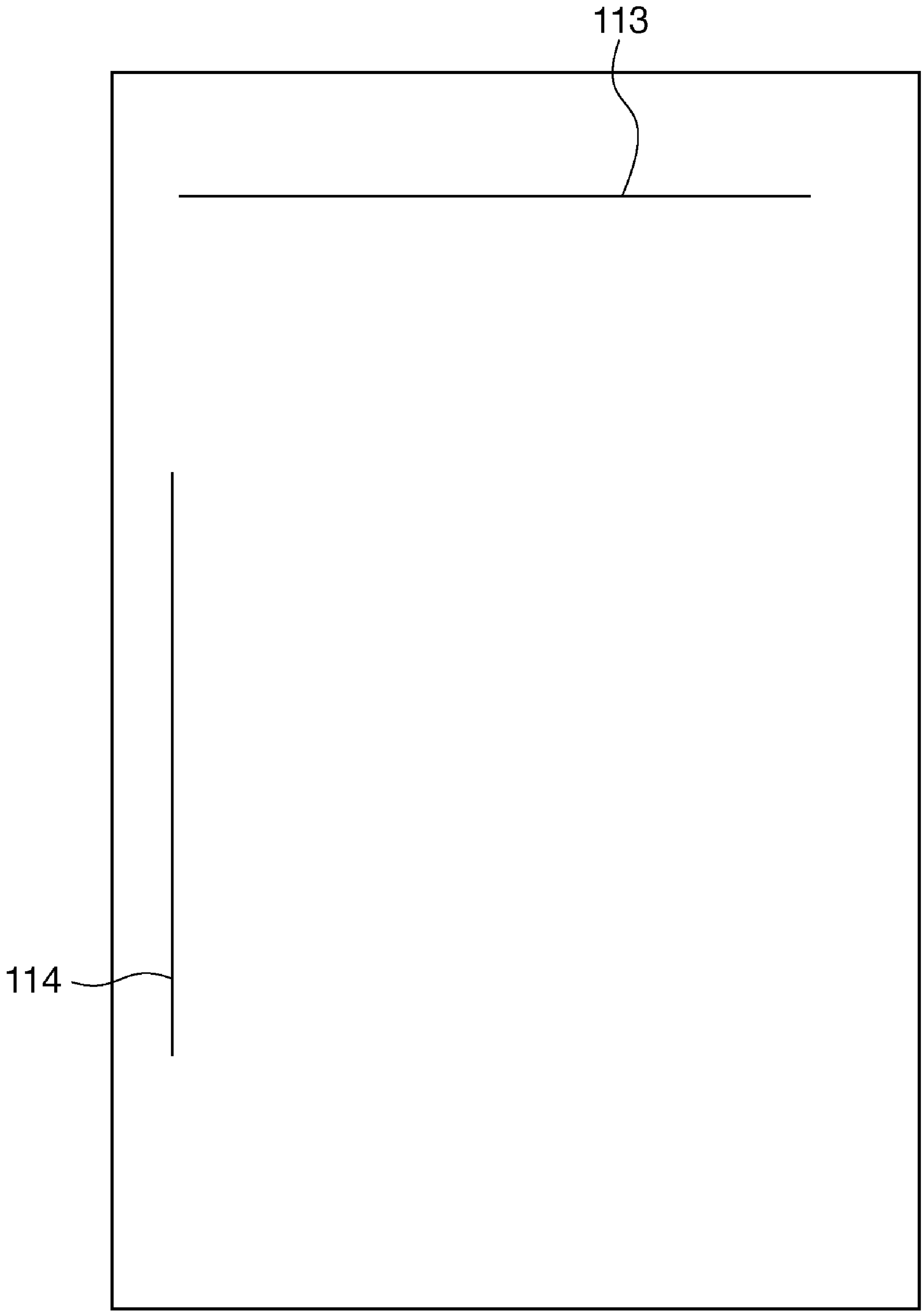
FIG. 16 is a diagram showing an exemplary adjustment pattern.
Figure 17:
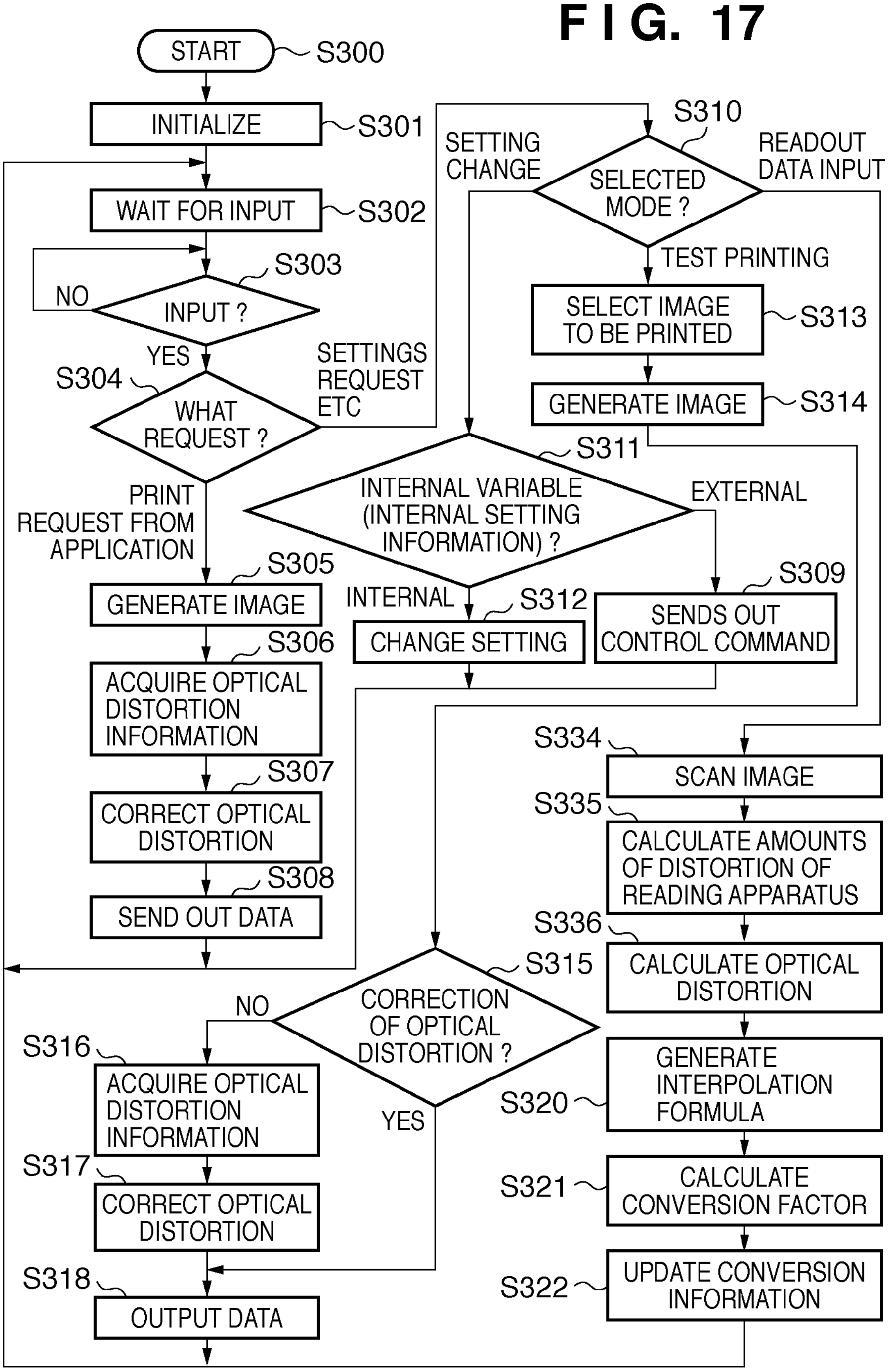
FIG. 17 is a flowchart of calibration procedures carried out by software running on an external apparatus.

Information about optical distortion can be acquired by image scanning using a component of the multicolor printing apparatus or an image reading apparatus (input means such as image scanner) on an external apparatus instead of visually reading the optical distortion. FIG. 15 shows a correction pattern according to the present embodiment. FIG. 16 shows an adjustment pattern according to the present embodiment. FIG. 17 shows processing procedures according to the present embodiment.

Images read by an image reading apparatus often contains distortion. This is because in a scanning image reading apparatus, a sensor array can become inclined minutely or pixels can become parallelogrammic. Besides, in an optical system of some digital cameras, distortion increases with increasing distance from the center. Thus, to measure the amount of distortion of the image reading apparatus, a distortion checking pattern 130 is added to an entire printed surface of the correction pattern. Although sequences of points arranged on a tetragonal lattice are shown in FIG. 15, a tetragonal grid may be used instead of the point sequences. The distortion checking pattern 130 combines a correction pattern and inclination reference pattern. The adjustment pattern shown in FIG. 16 is printed over the distortion checking pattern 130 using the multicolor printing apparatus to be calibrated. Then, the printed material is scanned by the image reading apparatus and misregistration is corrected using the resulting image data.

Referring to FIG. 17, the sheet on which the adjustment pattern has been printed is scanned by the image reading apparatus (S334). Points on the distortion checking pattern are recognized in the image data and positions of the points are determined. Then, the program determines whether the point sequences are arranged at equal intervals. If the point sequences are not arranged at equal intervals, the program calculates the amounts of distortion, assuming that the scanned image data contains distortion (S335). The term "equal intervals" means, of course, that differences among the intervals do not exceed a predetermined threshold. Since the lattice in FIG. 15 forms rectangles, it is determined whether the differences between points in each of various directions do not exceed a predetermined value. The various directions include vertical, horizontal, and diagonal directions. There are four diagonal directions from each pixel and all the four diagonal directions are included. If it is determined that there is distortion, the program calculates the amounts of distortion in image scanning (S336). Then, the program detects a pattern of detected amounts of optical distortion in the scanned image, adds coordinate-based distortion correction for the image reading apparatus, and thereby calculates the amounts of optical distortion (S321). Incidentally, when the amounts of distortion is read by machine, since there is no need to allow for visibility, in order to detect optical distortion, it is sufficient for the adjustment pattern to have one horizontal line 113 and one vertical line 114.

With the method according to the present invention which finds misregistration based on relative locations of the correction pattern and adjustment pattern, image distortion caused by inclination of the sensor array in the image reading apparatus does not present a problem because the image distortion is considered to show up as inclination of the entire image. However, peripheral distortion caused by lens aberrations need to be corrected. The peripheral distortion is not uniform among different parts of the image and is corrected by adjusting distances between the various points to predetermined standard values. For example, since aberrations are considered to be small near the center of the image, the distances (vertical, horizontal, and diagonal) between points near the center of the image are measured and used as standard distances in the respective directions. Then, for example, point-to-point distances in each column (vertical) are increased or decreased to conform to the vertical standard distance. Next, point-to-point distances in each rows (horizontal) are increased or decreased to conform to the horizontal standard distance. If rows are not parallel, the rows are rotated. This is done in units of rows containing groups of points rather than on a point by point basis. Consequently, the point-to-point distances in each row become uniform and the columns become parallel and equally spaced. Finally, vertical deviation is corrected by moving the rows. The corrections are made, of course, not only to the points in the correction pattern, but also to each pixel of the image data. Pixels other than those which correspond to the points in the correction pattern are corrected by an amount obtained by linearly interpolating the amounts of correction.

In this way, the distortion of the image obtained by the image reading apparatus is corrected, thereby producing image data. Based on the corrected image data and using the points on the correction pattern as markers, the amounts of deviation at the marker positions are measured and conversion information is generated thereby overwriting the old one.

Seventh Embodiment

Figure 18:
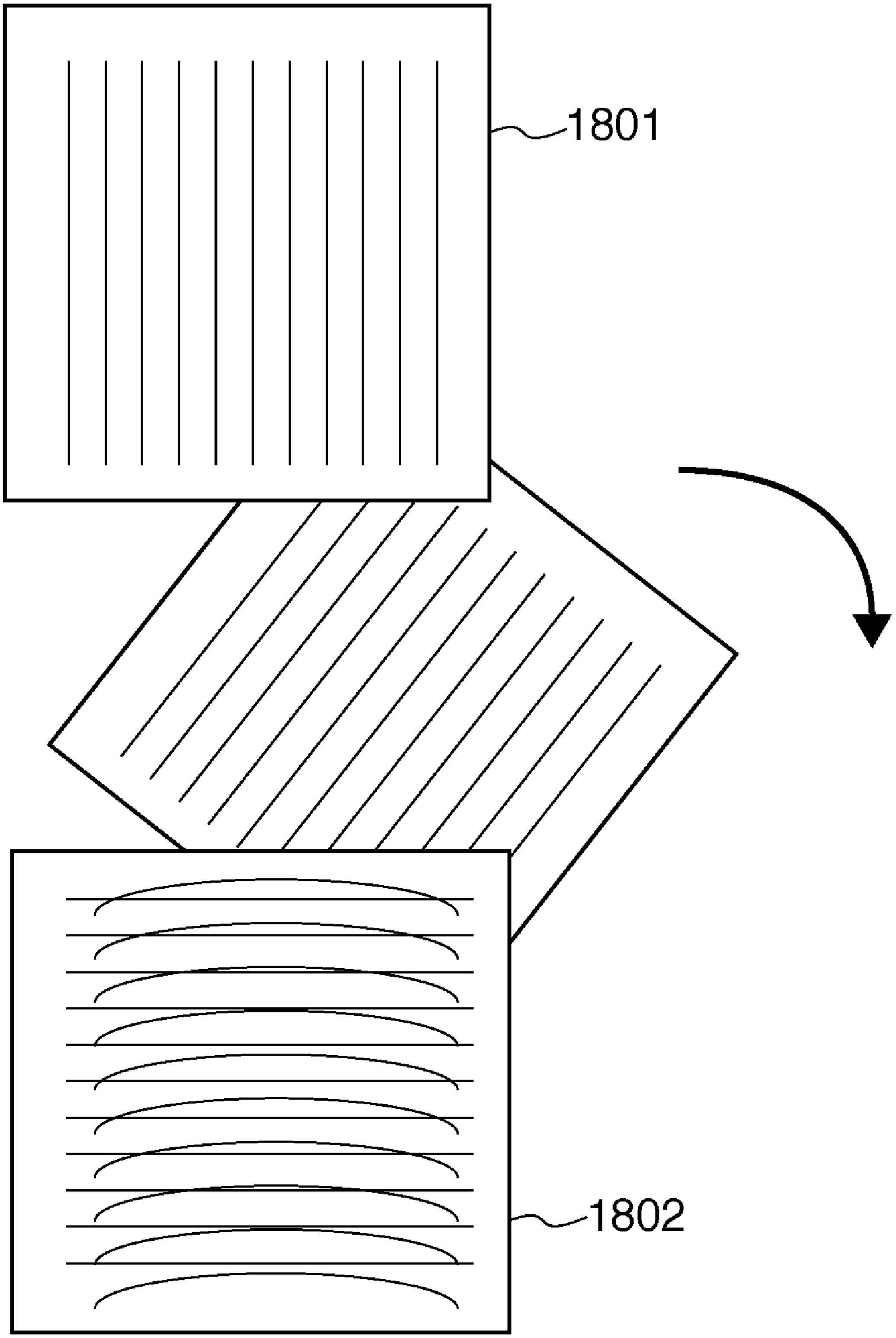
FIG. 18 is a diagram showing an example of how a correction pattern is printed and used.

In the above embodiments, the correction patterns are prepared and printed in advance. According to the present embodiment, a correction pattern is printed by the printing apparatus to be calibrated. However, output from the multicolor printing apparatus to be calibrated cannot be used, as it is, as a correction pattern because its horizontality is not ensured. Thus, according to the present invention, the multicolor printing apparatus prints out a correction pattern image by rotating it 90 degrees so that the image can be used as a correction pattern. FIG. 18 shows a concept of how the correction pattern is printed. That is, the printing apparatus records the correction pattern as straight lines running in the sub-scanning direction. As described above, even if main scanning is distorted, sub-scanning is not affected. Although the vertical lines in the correction pattern fluctuates up and down slightly due to distortion in the optical system, the vertical lines are printed in almost accurate positions in the right-to-left direction. The printed correction pattern is rotated 90 degrees before an adjustment pattern is printed on it.

It is assumed, for example, that an optical plane is inclined in the transport direction by approximately 10 pixels between the end point and start point of optical scanning carried out at 600 dpi. In terms of rotation of the scanning plane, since an A3 sheet is approximately 7000 pixels wide, deviation of the main scanning line along the sub-scanning direction is approximately arctan(7000/10)=0.08185. Thus, deviation in the main scanning direction is cos (arctan(7000/10))=$1.02\times 10^{-6}$, which is practically negligible. That is, even a multicolor printing apparatus with optical distortion can draw vertical lines. Thus, according to the present embodiment, information about the correction pattern is stored in a storage as in the case of the adjustment pattern. Also, a correction pattern output mode and adjustment pattern output mode are provided.

After printing the correction pattern on a sheet, the user rotates the sheet 90 degrees and supplies the sheet to the paper feeder of the multicolor printing apparatus. The adjustment pattern is printed over the correction pattern on the sheet in the adjustment pattern output mode. Subsequent reading procedures are carried out in the same manner as in the other embodiments. Since the correction pattern itself can be treated in the same way as the other test patterns, there is no difference in physical equipment configuration. In terms of software, an additional test pattern is stored.

According to the present embodiment, the multicolor printing apparatus is calibrated as follows.

(1) The operator selects a test pattern printing mode, selects the correction pattern from the test patterns, and prints the correction pattern.

(2) The operator supplies the sheet with the correction pattern printed to the paper feeder after turning the sheet 90 degrees.

(3) The operator selects a test pattern printing mode, selects the adjustment pattern from the test patterns, and prints the adjustment pattern.

The rest of the procedures are the same as in the first to sixth embodiments.

This makes it possible to correct misregistration caused by optical distortion of the printing apparatus without providing a correction pattern separately.

Other Embodiments

The present invention may be applied either to a system consisting of two or more apparatus (e.g., a host computer, interface devices, a reader, a printer, and the like) or to equipment consisting of a single apparatus (e.g., a copier, a printer, a facsimile machine, or the like). The object of the present invention can also be achieved by a storage medium containing program code that implements the functions of the above embodiments: the storage medium is supplied to a system or apparatus, whose computer then reads the program code out of the storage medium and executes it. In that case, the program code itself read out of the computer-readable storage medium will implement the functions of the above embodiments, and the program code itself and the storage medium which stores the program code will constitute the present invention.

Also, the present invention includes the following cases. Namely, the functions of the above embodiments can be implemented by part or all of the actual processing executed according to instructions from the program code by an OS (operating system) running on the computer. Also, the functions of the above embodiments can be implemented by part or all of the actual processing executed by a CPU or the like contained in a function expansion card inserted into the computer or a function expansion unit connected to the computer if the processing is performed according to instructions from the program code that has been read out of the storage medium and written into memory on the function expansion card or unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-300967, filed Nov. 20, 2007, which is hereby incorporated by reference herein in its entirety.

What is claimed is:

1. An image generating apparatus comprising:

an image generator configured to generate an image on a photosensitive member by scanning the photosensitive member in a main scanning direction and a sub-scanning direction with an optical beam;

an output controller configured to generate an adjustment pattern containing markers and a straight line object running along the main scanning direction using said image generator and output the adjustment pattern to a printing medium recorded with a straight reference line running in the main scanning direction, with the markers and the straight line object intersecting each other on the printing medium to allow a user to read an amount of deviation of the straight line object relative to the straight reference line at each position of the markers;

an input unit configured to accept input of an adjustment parameter, which represents the amount of deviation of the straight line object at each position of the markers relative to the straight reference line;

a conversion information generator configured to generate conversion information based on the adjustment parameter input by said input unit, the conversion information being used to correct deviation, in the sub-scanning direction, of the image generated by said image generator; and a conversion information storage configured to store the conversion information.

2. The image generating apparatus according to claim 1, wherein said output controller:

further outputs an image other than the adjustment pattern by generating the image using said image generator; and generates an image of the adjustment pattern without using the conversion information when outputting the adjustment pattern and generates images other than the adjustment pattern after making a correction using the conversion information.

3. The image generating apparatus according to claim 1, wherein:

the conversion information generated by said conversion information generator includes information on positions of scan line changing points in the main scanning direction and directions of deviation in the sub-scanning direction at the positions of the scan line changing points;

the positions of the scan line changing points correspond to positions where the straight line object intersects additional straight reference lines recorded on the printing medium and that are parallel to the straight reference line; and the additional straight reference lines are arranged spaced apart in the sub-scanning direction.

4. The image generating apparatus according to claim 3, wherein:

said input unit accepts, as the adjustment parameter, amounts of deviation, at a plurality of positions of the markers, of the straight line object relative to the straight reference line; and said conversion information generator generates an approximate function as the conversion information through interpolation from the amounts of deviation at the plurality of positions, the approximate function representing the amounts of deviation of the straight reference line object relative to the straight reference line.

5. The image generating apparatus according to claim 1, wherein said output controller generates the markers across the straight line object.

6. The image generating apparatus according to claim 1, wherein:

said input unit further accepts input of slope angle information, which represents inclination of the printing medium on which an image of the adjustment pattern has been printed, the adjustment parameter accepted by said input unit is corrected based on the slope angle information, and said conversion information generator generates the conversion information based on the corrected adjustment parameter.

7. An image generating apparatus comprising:

an image generator configured to generate an image on a photosensitive member by scanning the photosensitive member in a main scanning direction and a sub-scanning direction with an optical beam;

an output controller configured to generate an adjustment pattern containing a straight line object running along the main scanning direction using said image generator and output the adjustment pattern to a printing medium;

an input unit configured to accept input of an adjustment parameter, which represents an amount of deviation of the straight line object at each position of markers relative to a straight reference line running in the main scanning direction recorded on the printing medium, the straight line object intersecting the markers on the printing medium to allow a user to read an amount of deviation of the straight line object relative to the straight reference line at each position of the markers;

a conversion information generator configured to generate conversion information based on the adjustment parameter input by said input unit, the conversion information being used to correct deviation, in the sub-scanning direction, of the image generated by said image generator; and a conversion information storage configured to store the conversion information, wherein said input unit further accepts input of slope angle information, which represents inclination of the printing medium on which an image of the adjustment pattern has been printed, wherein the adjustment parameter accepted by said input unit is corrected based on the slope angle information, and wherein said conversion information generator generates the conversion information-based on the corrected adjustment parameter.

8. The image generating apparatus according to claim 7, wherein:

the adjustment pattern further contains a straight line object running along the sub-scanning direction; and the printing medium further includes a plurality of straight reference lines extending along the sub-scanning direction and differing from each in an angle relative to the sub-scanning direction;

said input unit accepts, as the slope angle information, an identifier corresponding to one of the straight reference lines extending along the sub-scanning direction that is parallel to the straight line object running along the sub-scanning direction.

9. A calibration method for an image generating apparatus equipped with an image generator configured to generate an image on a photosensitive member by scanning the photosensitive member in a main scanning direction and a sub-scanning direction with an optical beam, the calibration method comprising:

an output control step of generating an adjustment pattern containing a straight line object running along the main scanning direction using said image generator, and outputting the adjustment pattern to a printing medium on which a straight reference line has been printed along the main scanning direction;

an input step of accepting input of an adjustment parameter which represents an amount of deviation of the straight line object at each position of markers from the straight reference line printed on the printing medium, the straight line object being printed over the markers on the printing medium so that the amount of deviation is readable by a user;

a conversion information generating step of generating conversion information based on the adjustment parameter input in said input step, the conversion information being used to correct deviation, in the sub-scanning direction, of the image generated by said image generator; and a conversion information storage step of storing the conversion information in a conversion information storage.

10. The calibration method according to claim 9, wherein:

the conversion information generated by said conversion information generating step includes information on positions of scan line changing points in the main scanning direction and directions of deviation in the sub-scanning direction at the positions of the scan line changing points;

the positions of the scan line changing points correspond to positions where the straight line object intersects additional straight reference lines recorded on the printing medium and that are parallel to the straight reference line; and the additional straight reference lines are arranged spaced apart in the sub-scanning direction.

11. The calibration method according to claim 9, wherein:

in said input step, input of slope angle information is also accepted which represents inclination of the printing medium on which an image of the adjustment pattern has been printed;

the method further comprises the correcting step of correcting the adjustment parameter based on the in the input slope angle information; and in said conversion information generating step, the conversion information is generated based on the corrected adjustment parameter.

12. A non-transitory computer-readable storage medium containing a program executable by a computer perform the calibration method according to claim 9.

13. The image generating apparatus according to claim 6, wherein:

the adjustment pattern further contains a straight line object running along the sub-scanning direction; and the printing medium further includes a plurality of straight reference lines extending along the sub-scanning direction and differing from each in an angle relative to the sub-scanning direction;

said input unit accepts, as the slope angle information, an identifier corresponding to one of the straight reference lines extending along the sub-scanning direction that is parallel to the straight line object running along the sub-scanning direction.

* * * * *